(12) United States Patent
Takahashi et al.

(10) Patent No.: US 7,943,248 B2
(45) Date of Patent: May 17, 2011

(54) PERPENDICULAR MAGNETIC RECORDING MEDIA, PRODUCTION PROCESS THEREOF, AND PERPENDICULAR MAGNETIC RECORDING AND REPRODUCING APPARATUS

(75) Inventors: Migaku Takahashi, Sendai (JP); Masahiro Oka, Yokohama (JP); Akira Kikitsu, Yokohama (JP)

(73) Assignees: Tohoku University, Miyagi-ken (JP); Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 665 days.

(21) Appl. No.: 11/795,326

(22) PCT Filed: Jan. 31, 2006

(86) PCT No.: PCT/JP2006/301929
§ 371 (c)(1), (2), (4) Date: Jul. 16, 2007

(87) PCT Pub. No.: WO2006/082948
PCT Pub. Date: Aug. 10, 2006

(65) Prior Publication Data
US 2008/0118781 A1 May 22, 2008

Related U.S. Application Data

(60) Provisional application No. 60/650,534, filed on Feb. 8, 2005.

(30) Foreign Application Priority Data

Feb. 1, 2005 (JP) .................................. 2005-024946

(51) Int. Cl.
*G11B 5/66* (2006.01)

(52) U.S. Cl. ................................................... 428/828.1
(58) Field of Classification Search .................. 428/827, 428/828, 828.1, 829
See application file for complete search history.

(56) References Cited

U.S. PATENT DOCUMENTS

| | | | |
|---|---|---|---|
| 6,686,070 B1 * | 2/2004 | Futamoto et al. ............. 428/827 |
| 7,041,393 B2 | 5/2006 | Tanahashi et al. |
| 2002/0028357 A1 | 3/2002 | Shukh et al. |
| 2004/0009375 A1 * | 1/2004 | Tanahashi et al. ............. 428/695 |
| 2004/0038082 A1 * | 2/2004 | Tsumori ................. 428/694 SG |
| 2004/0062953 A1 * | 4/2004 | Futamoto et al. ....... 428/694 TS |

(Continued)

FOREIGN PATENT DOCUMENTS

JP 58-166531 A 10/1983

(Continued)

*Primary Examiner* — Holly Rickman
*Assistant Examiner* — Lisa Chau
(74) *Attorney, Agent, or Firm* — Sughrue Mion, PLLC

(57) ABSTRACT

Perpendicular magnetic recording media enabling high-density recording and reproduction of information, as well as a production process thereof, and a magnetic recording and reproducing apparatus, are provided. Perpendicular magnetic recording media, having at least a soft magnetic underlayer and perpendicular magnetic recording layer on a disc-shaped nonmagnetic substrate, in which the soft magnetic underlayer has at least two soft magnetic layers, and Ru or Re between the two soft magnetic layers, are provided; the easy axis of magnetization of the soft magnetic underlayer has a desired direction; the easy axis of magnetization of the soft magnetic underlayer is substantially distributed in a direction except a radial direction of the nonmagnetic substrate, and, the bias magnetic field of the antiferromagnetic coupling in the direction of the easy axis of magnetization of the soft magnetic underlayer is 10 Oersteds (790 A/m) or greater.

15 Claims, 16 Drawing Sheets

U.S. PATENT DOCUMENTS

2004/0234818 A1* 11/2004 Tanahashi et al. ..... 428/694 TM
2005/0249980 A1* 11/2005 Itoh et al. ..................... 428/828

FOREIGN PATENT DOCUMENTS

| JP | 60-052919 A | 3/1985 |
| JP | 62-212918 A | 9/1987 |
| JP | 6-103553 A | 4/1994 |
| JP | 2001-155321 A | 6/2001 |
| JP | 2001-155322 A | 6/2001 |
| JP | 2004-039152 A | 2/2004 |
| JP | 2004-118894 A | 4/2004 |
| JP | 2007-026514 A | 2/2007 |
| JP | 2007-102833 A | 4/2007 |

* cited by examiner

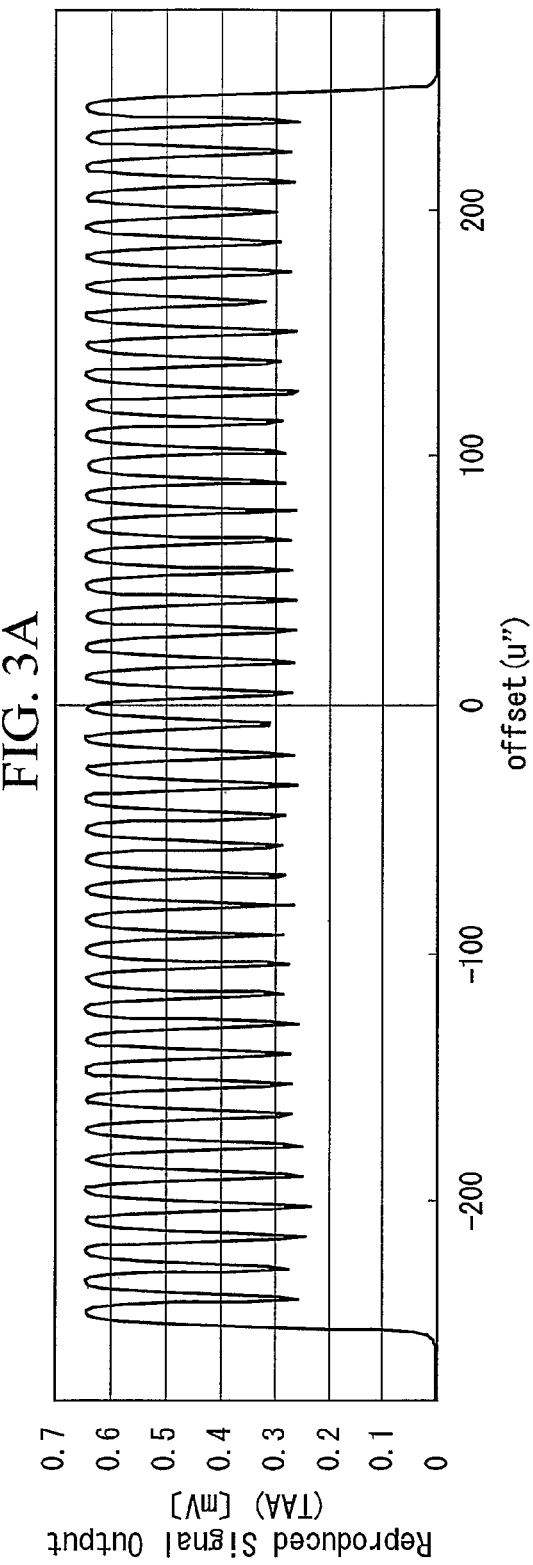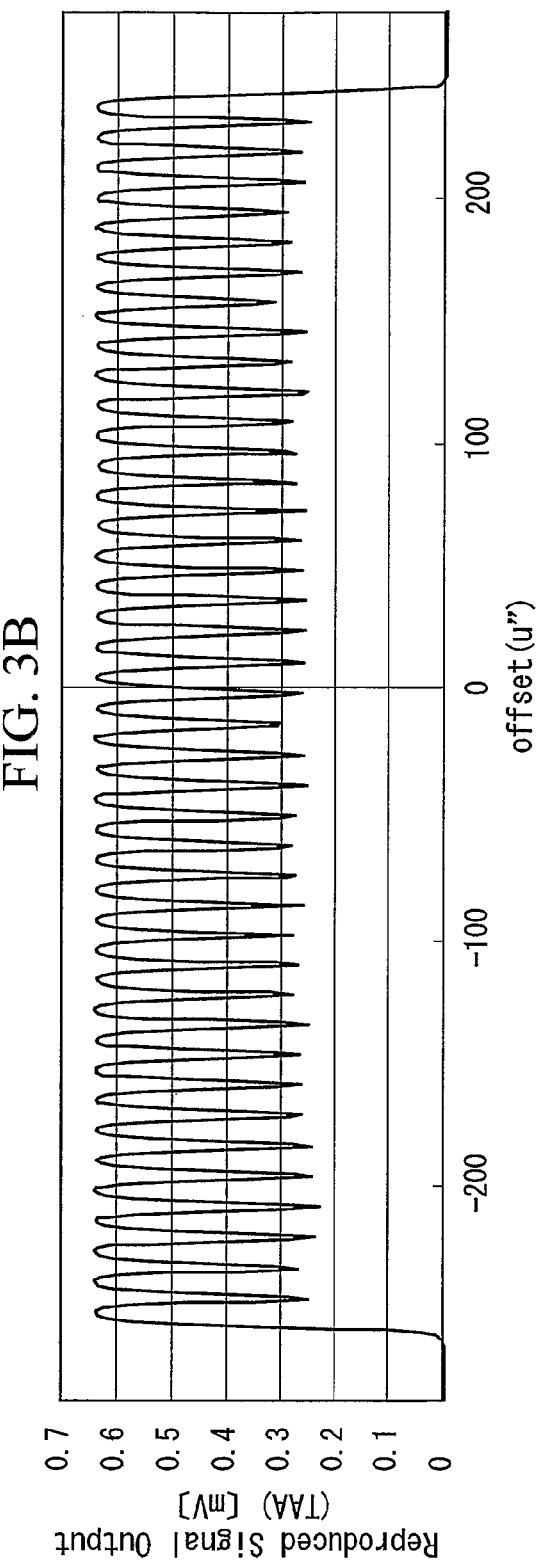

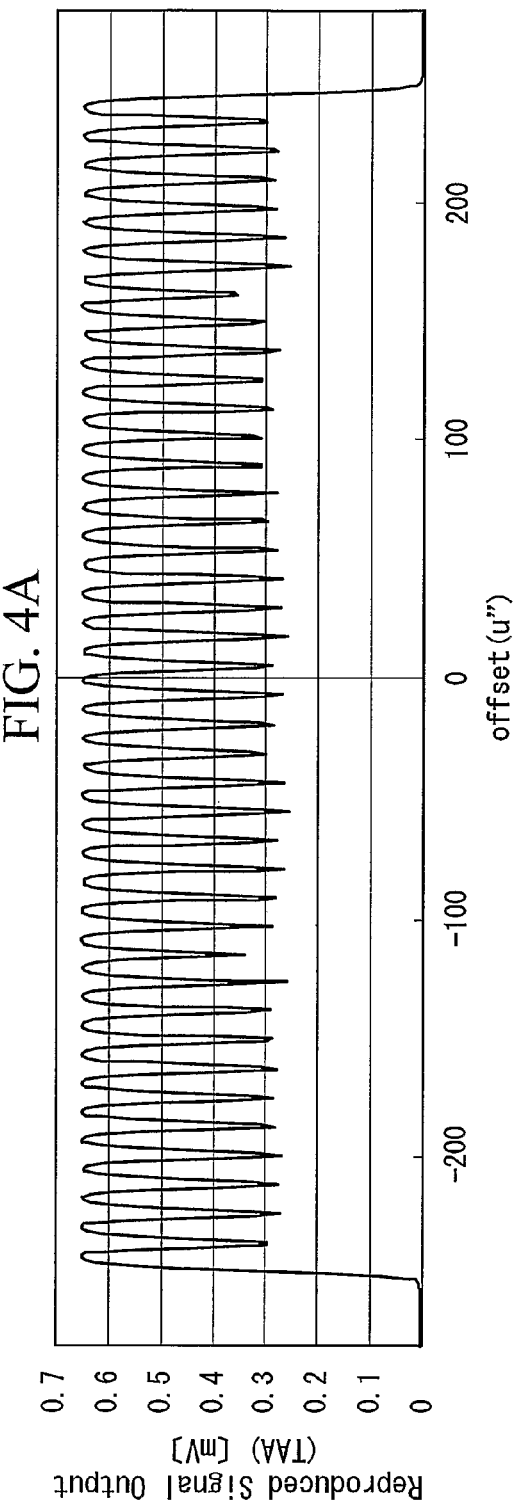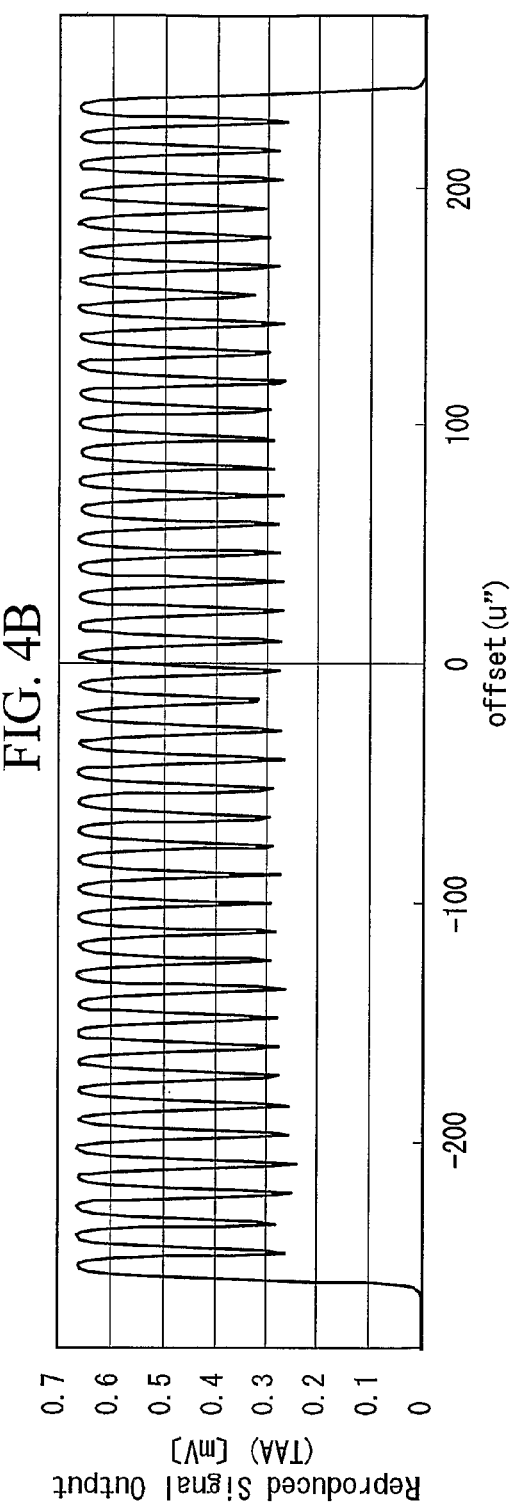

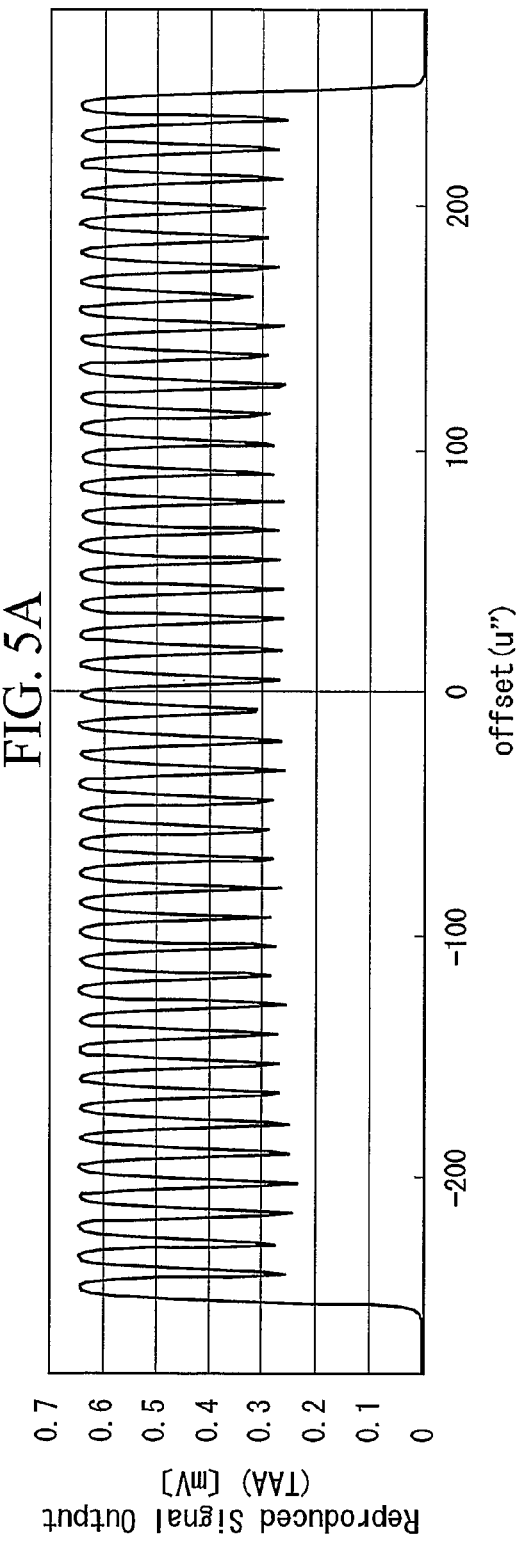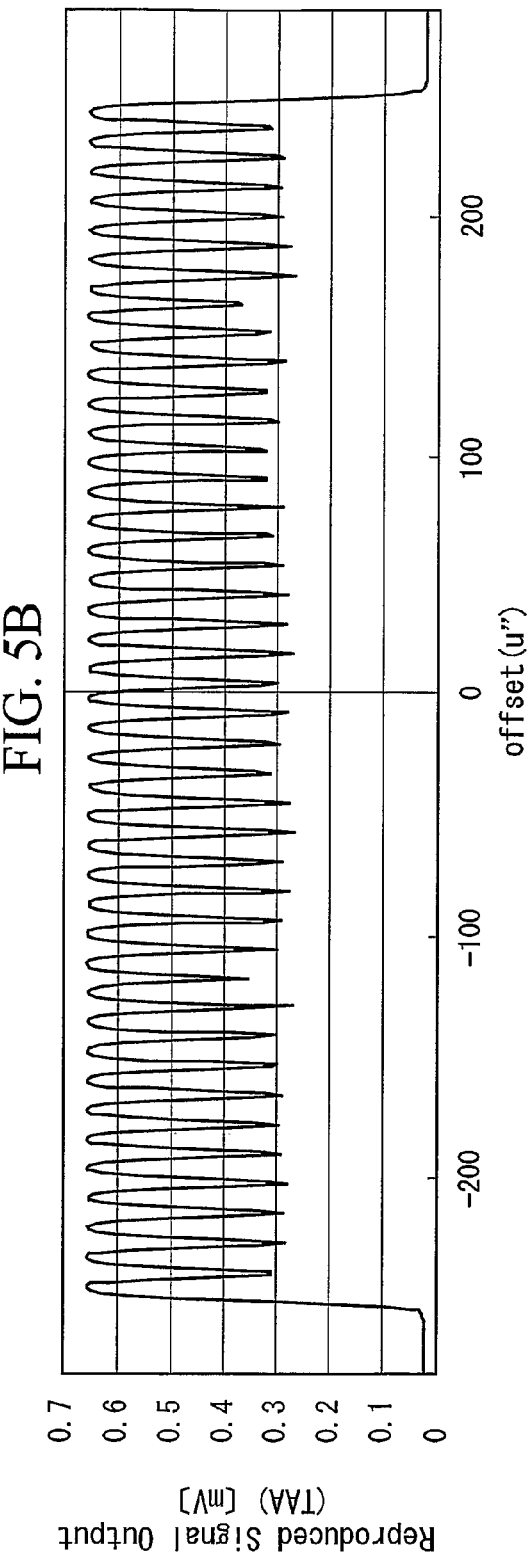

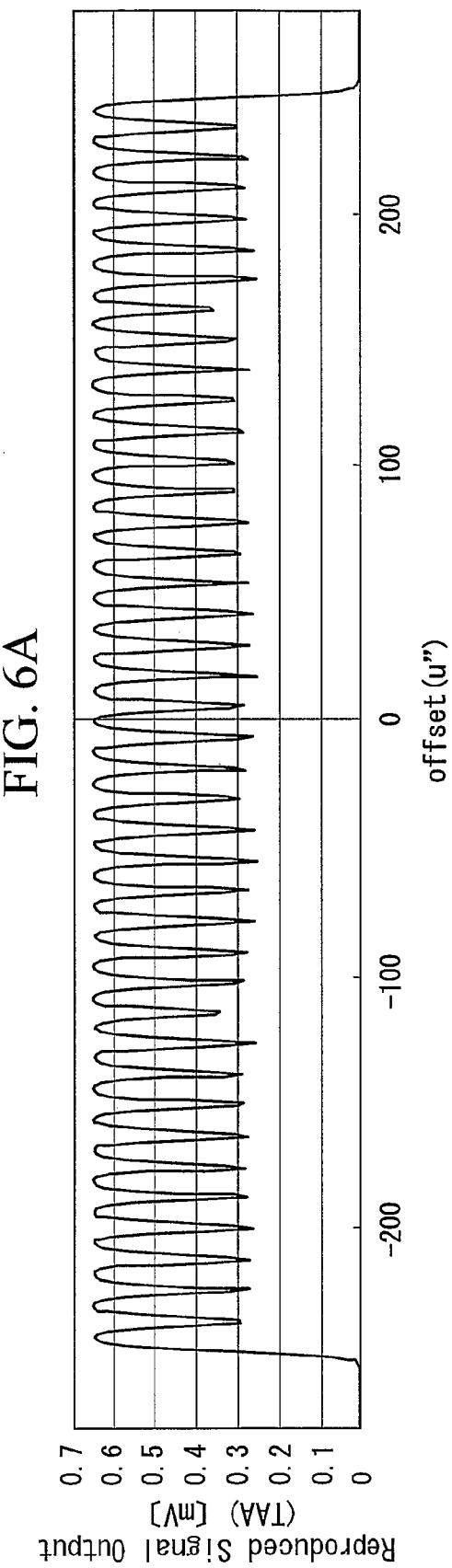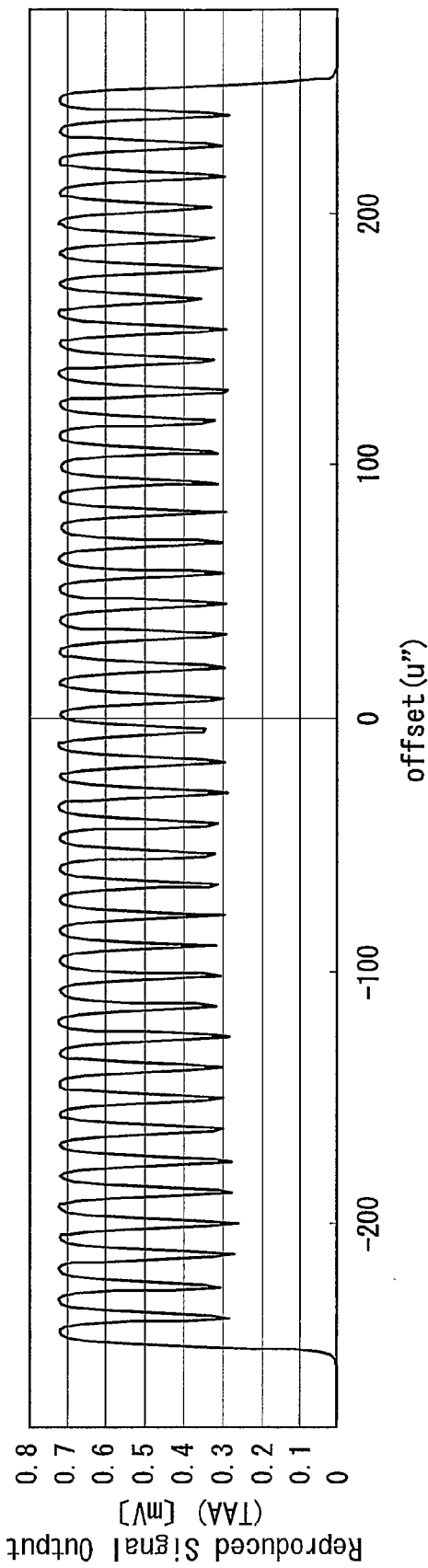

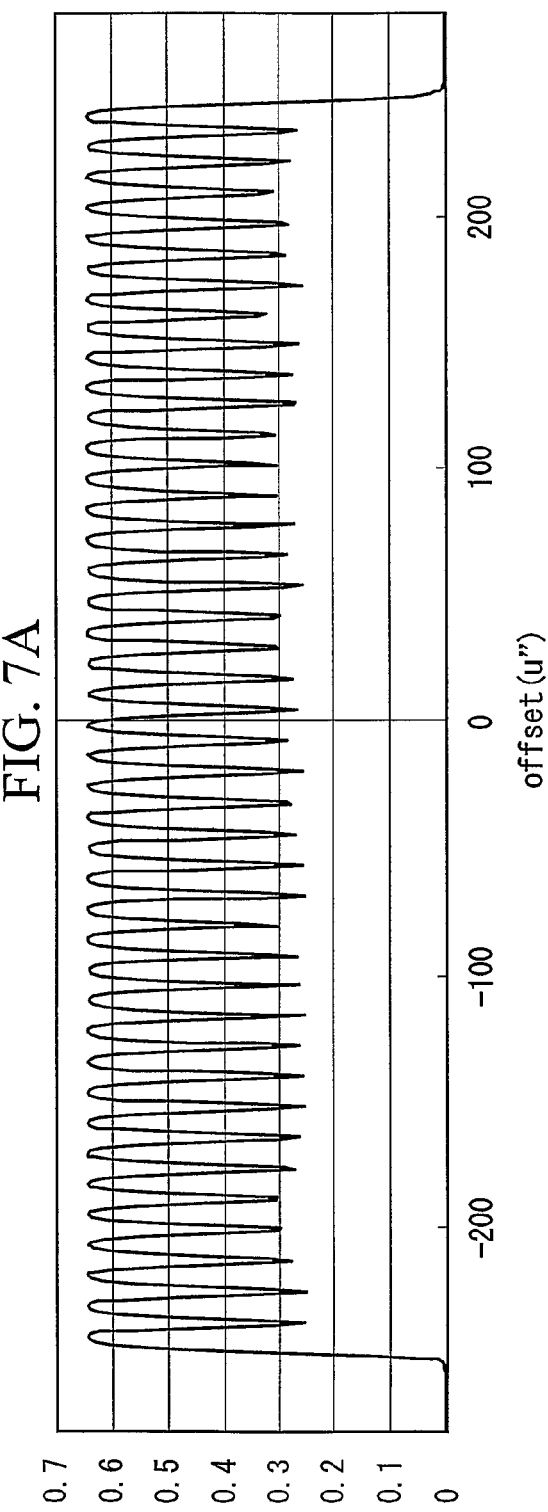
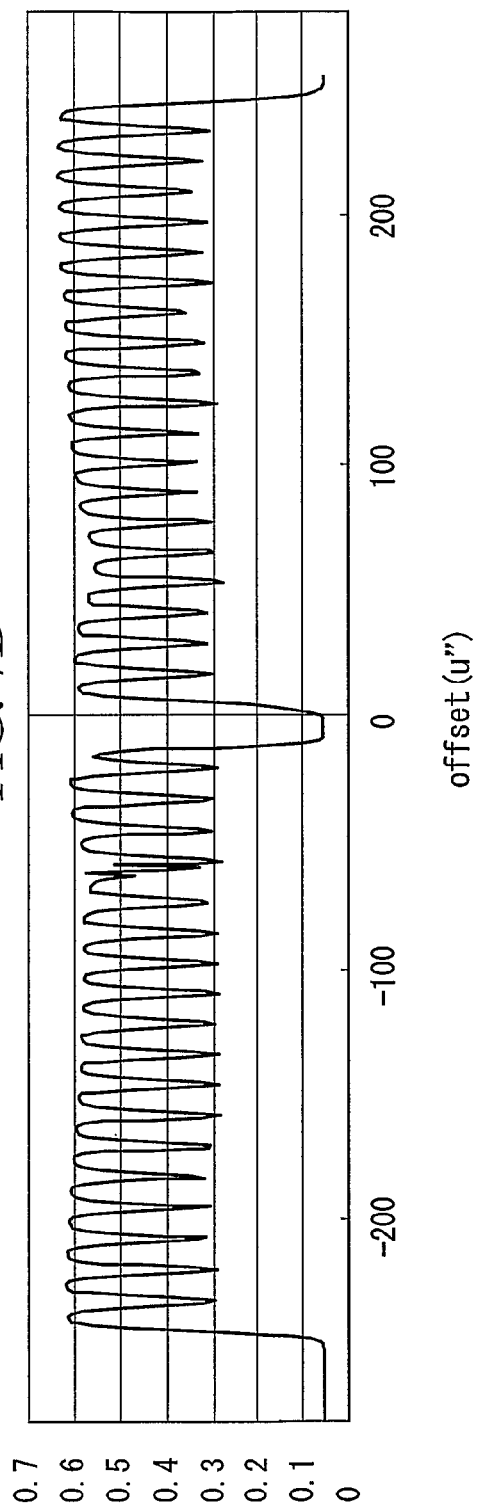

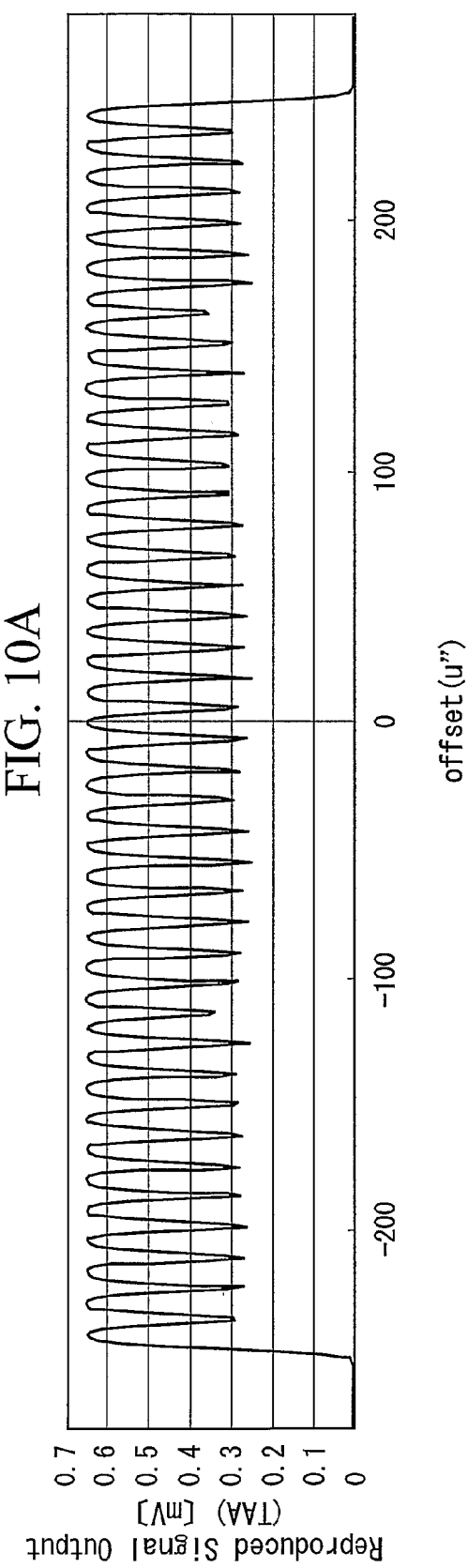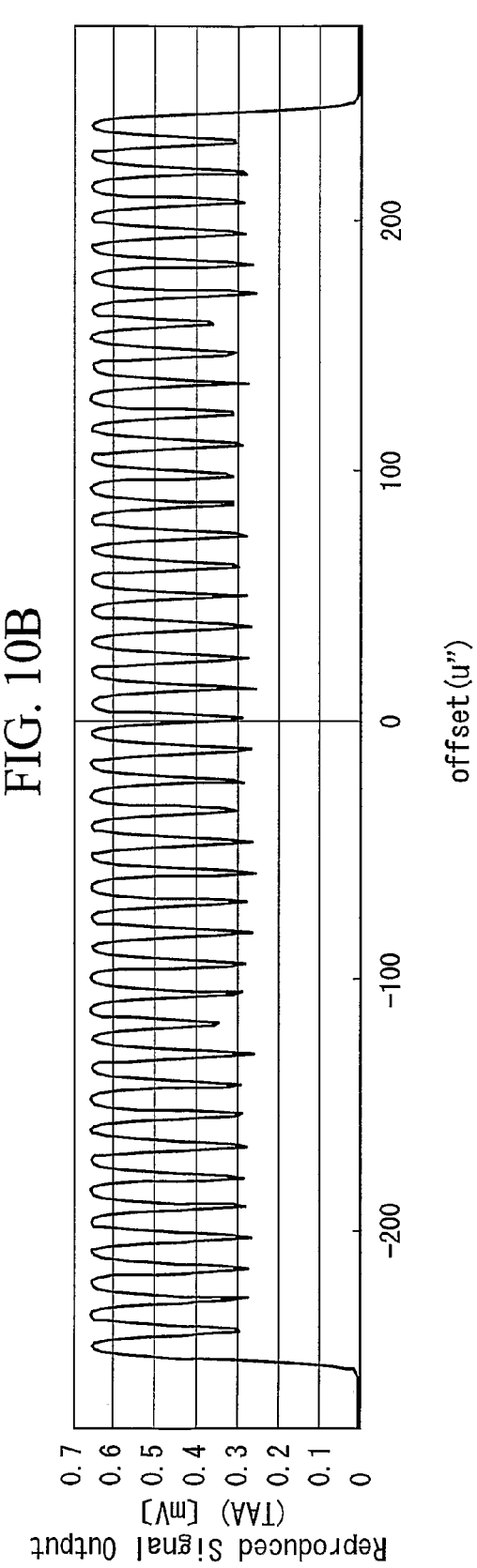

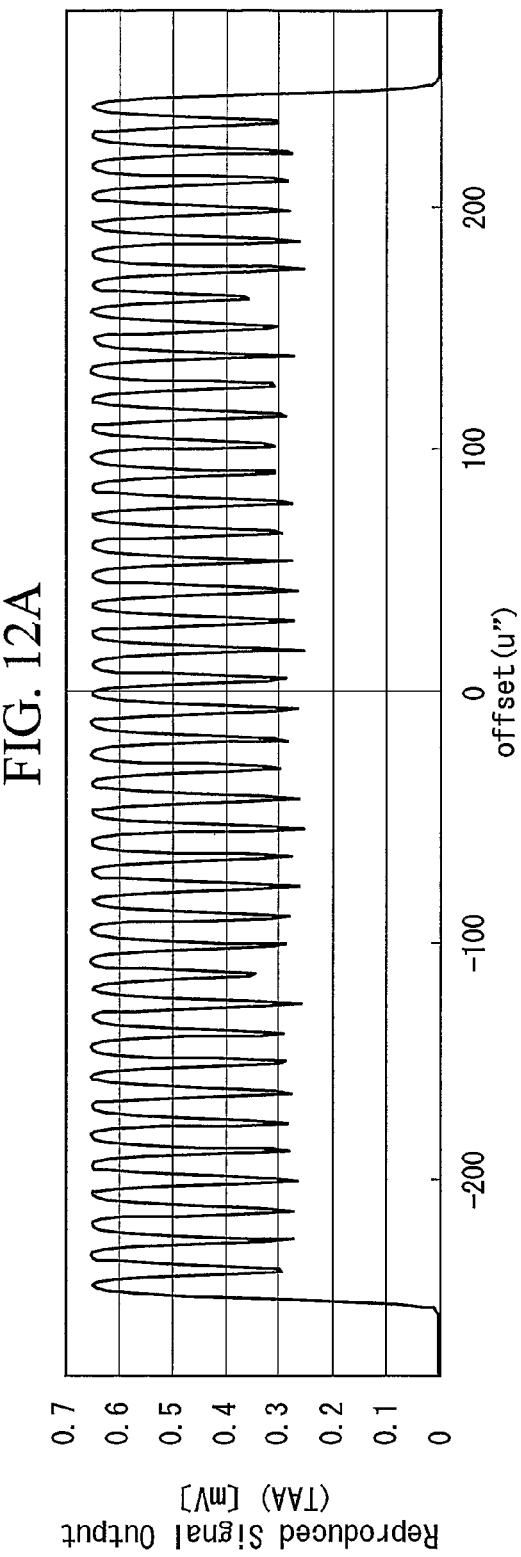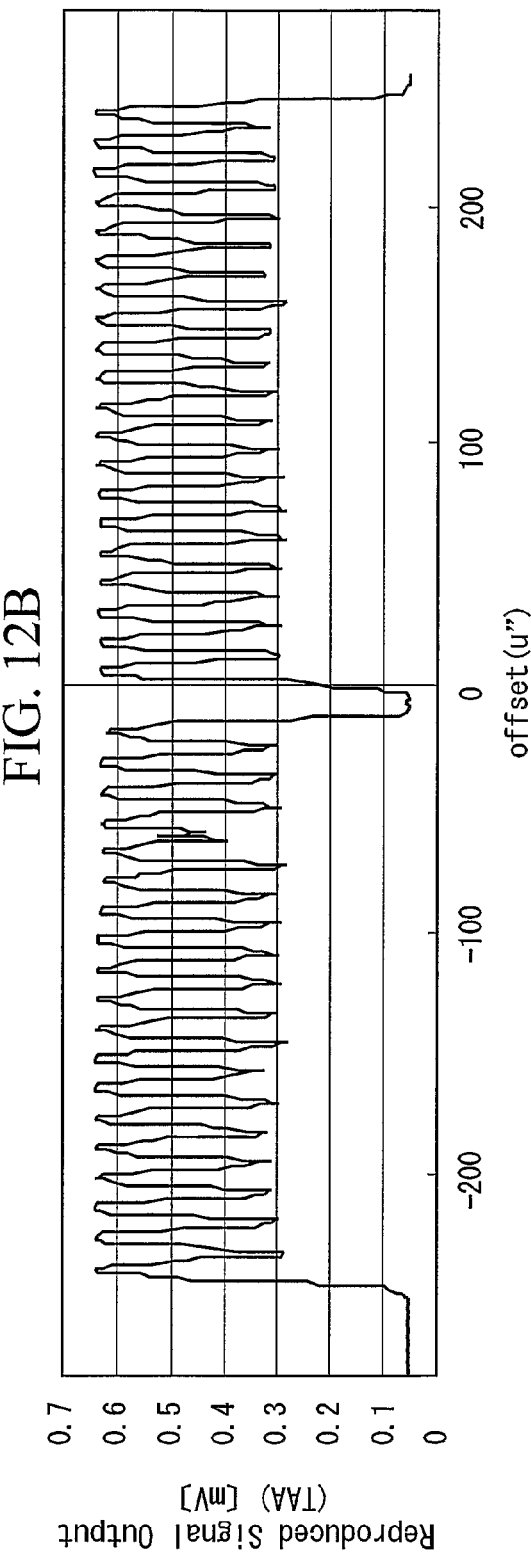

PERPENDICULAR MAGNETIC RECORDING MEDIA, PRODUCTION PROCESS THEREOF, AND PERPENDICULAR MAGNETIC RECORDING AND REPRODUCING APPARATUS

CROSS REFERENCE TO RELATED APPLICATIONS

This application is a national stage of International Application No. PCT/JP2006/301929 filed on Jan. 31, 2006, claiming benefit from U.S. Provisional Application No. 60/650,534 filed on Feb. 8, 2005 and priority from Japanese Patent Application No. 2005-024946 filed on Feb. 1, 2005, the disclosures of which are incorporated herein by reference.

TECHNICAL FIELD

This invention relates to perpendicular magnetic recording media, a method of manufacturing such media, and a magnetic recording and reproducing apparatus using the perpendicular magnetic recording media.

BACKGROUND ART

In the perpendicular magnetic recording method, the easy axis of magnetization of the magnetic recording layer, which in conventional media is directed within the plane of the media, is directed in the direction perpendicular to the media; as a result, the demagnetizing field in the vicinity of the magnetization transition region, which is the boundary between recorded bits, is decreased, so that the higher the recording density, the more magnetostatically stable the recorded state, with improved resistance to thermal fluctuations; hence the method is appropriate for increasing areal densities.

When a soft magnetic underlayer, consisting of soft magnetic material, is provided between the substrate and the perpendicular magnetic recording layer, the functions of so-called perpendicular double-layer media are obtained, and excellent recording performance can be obtained. At this time, the soft magnetic underlayer serves to provide a return path for the recording magnetic field from the magnetic head, and can improve the recording and reproduction efficiency.

In general, perpendicular magnetic recording media is configured with a soft magnetic underlayer provided on a substrate, on which are formed, in order, an soft magnetic underlayer which directs the magnetization easy axis of the magnetic layer to be perpendicular to the plane of the substrate, a perpendicular magnetic recording layer consisting of a Co alloy, and a protective layer. However, in recent years, the WATE (for Wide Area Track Erasure, or Wide Adjacent Track Erasure) phenomenon has come to be recognized as a problem in perpendicular magnetic recording media. The WATE phenomenon is a problem specific to perpendicular magnetic recording media, and is a phenomenon in which, when a signal is recorded in a particular track, signals are demagnetized over a broad area extending for several μm from the recorded track. Methods for alleviating the problem, mainly through the structure or magnetic anisotropy of the soft magnetic underlayer, have been proposed (see for example Patent Reference 1).

It is also proposed that aligning the direction of the magnetization easy axis of the soft magnetic underlayer in particular in the substrate radial direction is effective for the above problem. Following methods are proposed for realizing this magnetic structure;

1) depositing the soft magnetic underlayer under a magnetic field in the radial direction
2) stacking a soft magnetic layer and an antiferromagnetic film as a soft magnetic underlayer (see for example Patent Reference 2 and Patent Reference 3).

Common method to align the magnetization easy axis direction of the soft magnetic underlayer in the radial direction is to deposit the soft magnetic underlayer in a magnetic field from a magnetron, which generates radial magnetic flux and is placed concentric to the substrate. This method is not effective for a small substrate, particularly for commercialized one with a diameter of 26 mm or 22 mm. When films are deposited simultaneously on the plurality of small substrates, deposition under an uniform magnetic field is difficult and consequently the direction of the magnetization easy axis of the soft magnetic underlayer is directed in various directions.

Patent Reference 1: Japanese Unexamined Patent Application, First Publication No. S58-166531
Patent Reference 2: Japanese Unexamined Patent Application, First Publication No. H06-103553
Patent Reference 3: US 2002/0028357

In addition, film deposition in a magnetic field entails the following problems.
(1) It is difficult to control the magnetic field uniform in the entire radial direction.
(2) The magnetic field is smaller in the inner-periphery portion of the substrate.

As media sizes continue to grow smaller in future, (2) is anticipated to become a serious problem.

Annealing process under a magnetic filed is also proposed for this problem, including the stacking of MnIr antiferromagnetic layer in the soft magnetic underlayer. However, this process needs relatively high temperature and results in the degradation in the magnetic properties of the soft magnetic underlayer and the perpendicular magnetic recording layer. When the soft magnetic underlayer, which is magnetized uniformly in the radial direction, is used, read-write characteristics, especially for the SNR (signal-to-noise ratio) are degraded.

This invention was devised in light of the above circumstances, and has as an object the provision of perpendicular magnetic recording media enabling recording and reproduction of information at high densities, and a method of manufacture and magnetic recording and reproducing apparatus for such media, drawing on a reanalysis of the action of magnetic anisotropy in the soft magnetic underlayer.

DISCLOSURE OF INVENTION

In order to resolve the above problems, the following inventions are provided:
(1) A perpendicular magnetic recording media, comprising a disc-shaped nonmagnetic substrate, a soft magnetic underlayer on a disc-shaped nonmagnetic substrate comprised of at least two soft magnetic layers and a layer of Ru or Re between the two soft magnetic layers, and a perpendicular magnetic recording layer;
wherein, an easy axis of magnetization of the soft magnetic underlayer has a desired direction, and is substantially distributed in a direction except radial direction of the nonmagnetic substrate, and a bias magnetic field of the antiferromagnetic coupling in the direction of the easy axis of magnetization of the soft magnetic underlayer is 10 Oersteds (790 A/m) or greater.
(2) The perpendicular magnetic recording media of (1), wherein the easy axis makes an angle θ with the radial direction of the nonmagnetic substrate, and a percentage of an area of a portion in which 5°<θ<90° to an area of the entire soft magnetic underlayer is 90% or greater.

(3) A perpendicular magnetic recording media according of (2), wherein the percentage of an area of a portion in which 5°<θ<85° to an area of the entire soft magnetic underlayer is 95% or greater.

(4) The perpendicular magnetic recording media according to (2) wherein the easy axis of magnetization is distributed in parallel in the same direction.

(5) A perpendicular magnetic recording media according to (2), wherein the easy axis of magnetization is distributed in a spiral shape, and in a direction from a center portion to a circumferential portion of the nonmagnetic substrate.

(6) A perpendicular magnetic recording media according to (2), wherein the easy axis of magnetization is distributed in a circle sector shape, wherein the center of the sector locates near the circumferential portion of the substrate or outside of the substrate other than at the center portion of the substrate.

(7) A perpendicular magnetic recording media according to any one among (1) to (6), wherein the nonmagnetic substrate is of glass or of silicon.

(8) A perpendicular magnetic recording media according to any one among (1) to (7), wherein the total film thickness of the soft magnetic layers constituting the soft magnetic underlayer is 20 nm or greater and 120 nm or less.

(9) A perpendicular magnetic recording media according to any one among (1) to (8), wherein the diameter of the nonmagnetic substrate is 26 mm or less.

(10) A method of manufacturing a perpendicular magnetic recording media comprised of a disc-shaped nonmagnetic substrate, a soft magnetic underlayer on a disc-shaped nonmagnetic substrate having at least two soft magnetic layers and a layer of Ru or Re between the two soft magnetic layers, and a perpendicular magnetic recording layer; comprising step I of deposition of the soft magnetic underlayer, and step II after step I of aligning the easy axis of magnetization of the soft magnetic underlayer in one direction across the nonmagnetic substrate, by cooling the nonmagnetic substrate from the heated state while in a state in which a magnetic field is applied in one direction.

(11) A method of manufacturing a perpendicular magnetic recording media comprised of a disc-shaped nonmagnetic substrate, a soft magnetic underlayer on a disc-shaped nonmagnetic substrate having at least two soft magnetic layers and a layer of Ru or Re between the two soft magnetic layers, and a perpendicular magnetic recording layer; comprising a step of aligning the easy axis of magnetization of the soft magnetic underlayer in one direction across the nonmagnetic substrate by deposition of the soft magnetic underlayer while in a state in which a magnetic field is applied in one direction.

(12) The method of manufacturing a perpendicular magnetic recording media according to (11), wherein the easy axis of magnetization of the soft magnetic underlayer is aligned by means of a process of heating after film deposition followed by cooling in a magnetic field directed in one direction.

(13) A perpendicular magnetic recording media manufactured using the method of any one among (10) to (12).

(14) A magnetic recording and reproducing apparatus, comprising
the perpendicular magnetic recording media of any one among (1) to (9), and (13).

BRIEF DESCRIPTION OF THE DRAWINGS

FIG. 3 shows profiles of tracks in Embodiment 1 and Embodiment 6, wherein (A) shows the initial state, and (B) shows a state after recording;

FIG. 4 shows profiles of tracks in Embodiment 2 and Embodiment 7, wherein (A) shows the initial state, and (B) shows a state after recording;

FIG. 5 shows profiles of tracks in Embodiment 4 and Embodiment 9, wherein (A) shows the initial state, and (B) shows a state after recording;

FIG. 6 shows profiles of tracks in Embodiment 5 and Embodiment 10, wherein (A) shows the initial state, and (B) shows a state after recording;

FIG. 7 shows profiles of tracks in Comparison Example 1 and Comparison Example 3, wherein (A) shows the initial state, and (B) shows a state after recording;

FIG. 10 shows profiles of tracks in Embodiment 11 and Embodiment 14, wherein (A) shows the initial state, and (B) shows a state after recording;

FIG. 12 shows profiles of tracks in Embodiment 13 and Embodiment 16, wherein (A) shows the initial state, and (B) shows a state after recording;

BEST MODE FOR CARRYING OUT THE INVENTION

This invention relates to magnetic disc media adopting a perpendicular magnetic recording method, in which (1) the soft magnetic underlayer has a structure in which at least two soft magnetic layers and Ru or Re between the two soft magnetic layers are provided, the easy axis of magnetization of the soft magnetic underlayer has a desired direction, (2) the easy axis is substantially distributed in a direction except radial direction of the nonmagnetic substrate, and (3) a bias magnetic field of the antiferromagnetic coupling in the direction of the easy axis of magnetization of the soft magnetic underlayer is 10 Oersteds (790 A/m) or greater.

Further, a percentage of an area of a portion in which the easy axis is distributed in a direction except radial direction of the nonmagnetic substrate, to the area of the entire soft magnetic underlayer, is 50% or greater. It is preferable that the percentage is 75% or greater. It is more preferable that the percentage is 90% or greater.

Figure 17:
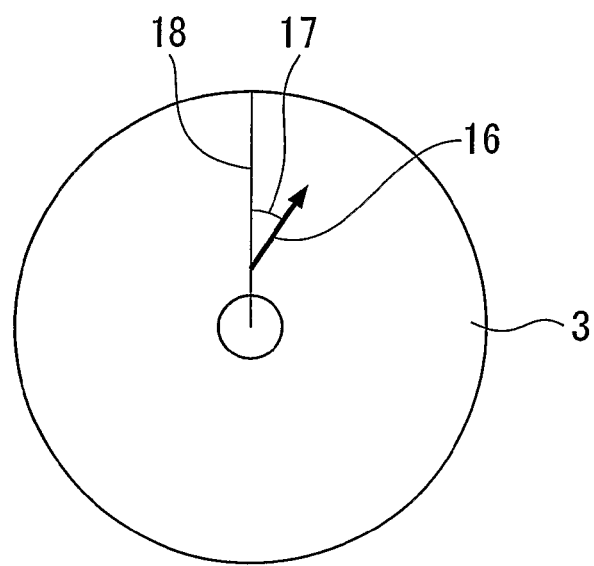
FIG. 17 shows schematic view of the planar structure the direction of an easy axis of magnetization of a soft magnetic underlayer.

Further, as shown in FIG. 17, when the angle 17 made by the easy magnetization axis direction 16 of the soft magnetic underlayer 3 with the substrate radial direction 18 is θ, a percentage of an area of a portion in which 5<θ<90° to an area of the entire soft magnetic underlayer is 90% or greater. By this means the WATE phenomenon which is a problem particular to perpendicular magnetic recording media is effectively suppressed.

Figure 9:
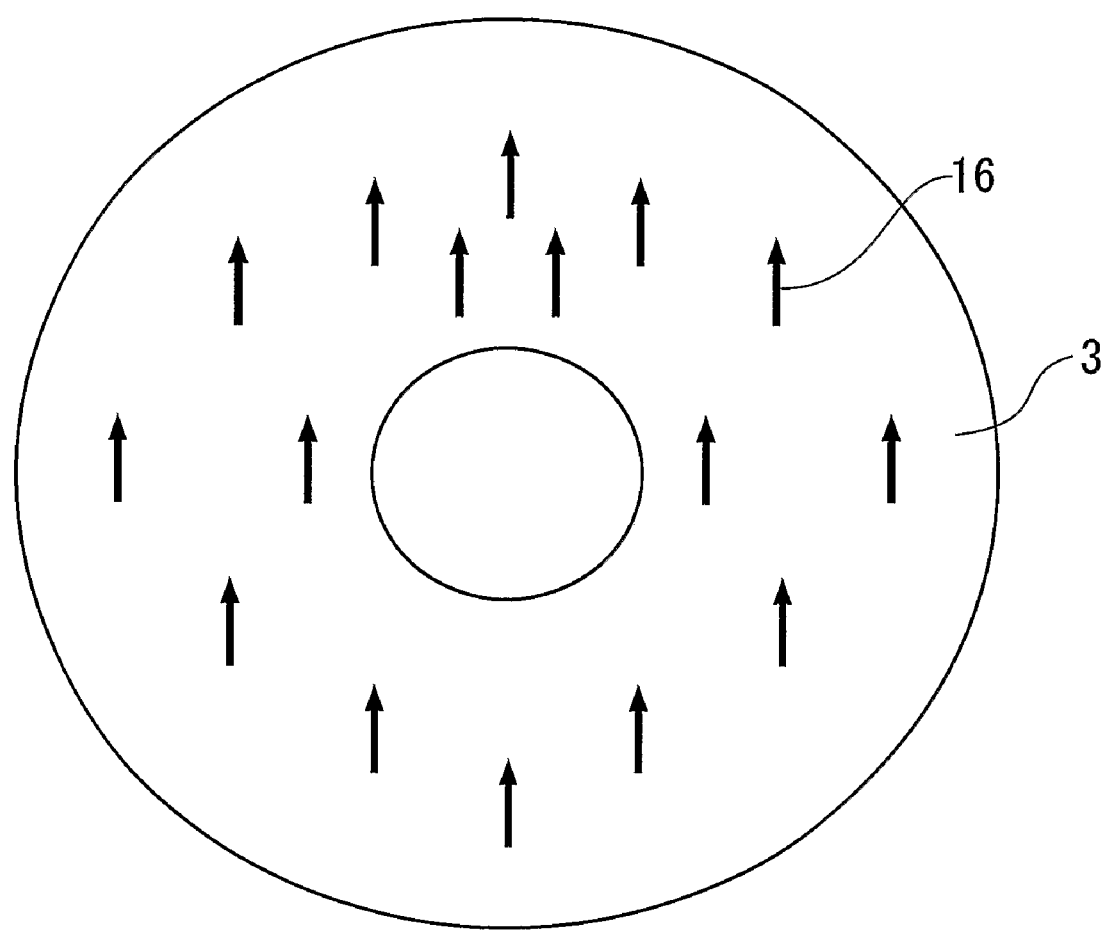
FIG. 9 shows schematic view of the planar structure of the direction of the easy axis of magnetization of a soft magnetic underlayer.

Also, as shown in FIG. 9, in this invention of the perpendicular magnetic recording media, the easy axis of magnetization 16 of soft magnetic underlayer is in parallel in the same direction.

Figure 18:
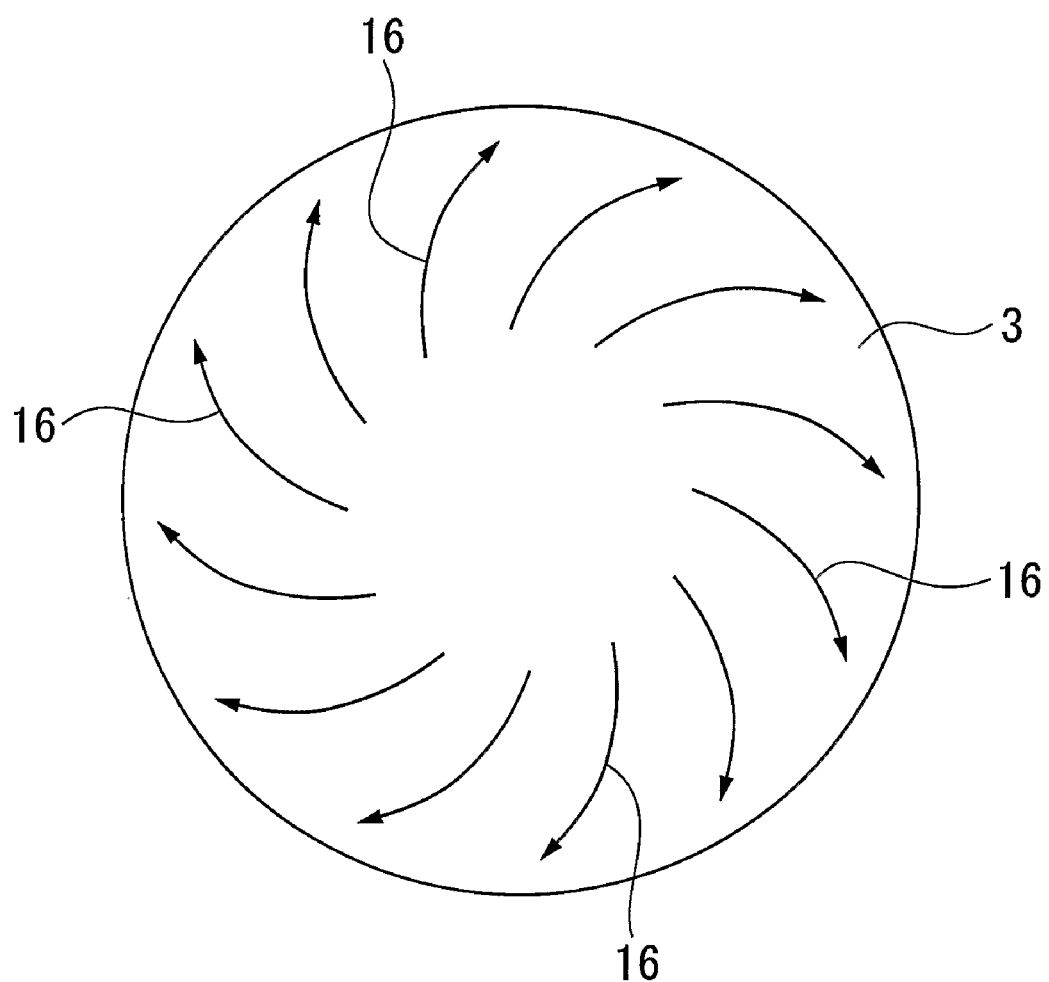
FIG. 18 shows schematic view of the planar structure the direction of an easy axis of magnetization of a soft magnetic underlayer.

Also, as shown in FIG. 18, in this invention of the perpendicular magnetic recording media, the easy axis of magnetization 16 is distributed in a spiral shape.

Figure 16:
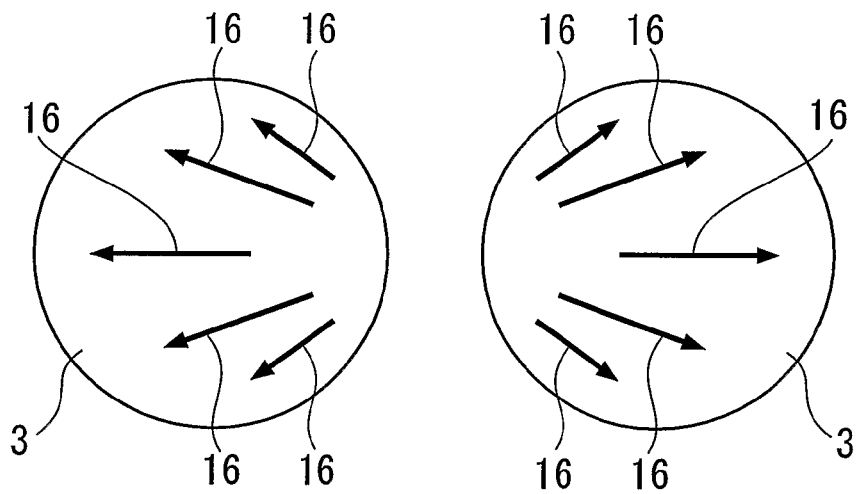
FIG. 16 shows schematic view of the planar structure of the direction of the easy axis of magnetization of a soft magnetic underlayer.

Also, as shown in FIG. 16, in this invention of the perpendicular magnetic recording media, the easy axis of magnetization 16 is distributed in a circle sector shape, wherein the center of the sector locates near the circumferential portion of the substrate or outside of the substrate other than at the center portion of the substrate.

The following is a detailed explanation to this invention of the perpendicular magnetic recording media.

Figure 1:
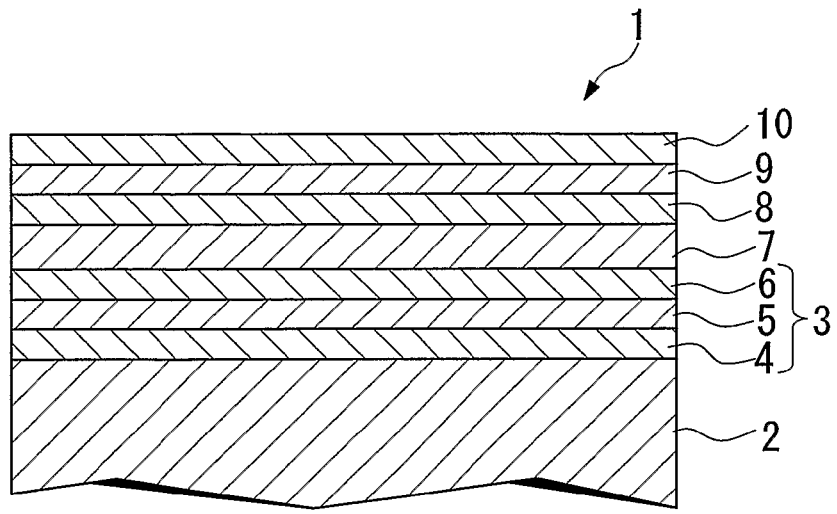
FIG. 1 is a cross-sectional view of perpendicular magnetic recording media of the invention.

FIG. 1 shows an example of a first aspect of perpendicular magnetic recording media 1 of this invention. The perpendicular magnetic recording media 1 shown here is configured by forming, in order on a nonmagnetic substrate 2, a first soft magnetic layer 4, Ru layer 5 and second soft magnetic layer 6, as a soft magnetic underlayer 3; on top of this an underlayer (alignment control layer) 7; perpendicular magnetic recording layer 8; protective layer 9; and lubrication layer 10.

As the nonmagnetic substrate 2, a metal substrate consisting of a metal material such as aluminum or an aluminum alloy may be used, or, a nonmetallic substrate, consisting of a nonmetallic material such as glass, ceramics, silicon, silicon carbide, carbon, or similar, may be used.

Glass substrates include amorphous glass and crystallized glass; as amorphous glass, a soda lime glass or aluminosilicate glass can be used. As crystallized glass, lithium-containing crystallized glass can be used.

As the nonmagnetic substrate 2, a glass substrate or silicon substrate are particularly preferable.

It is desirable that the nonmagnetic substrate 2 have an average surface roughness Ra of 0.8 nm or less, and preferably 0.5 nm or less, from the standpoint of high-density recording using a low flying-height recording head.

It is desirable that surface waviness Wa be 0.3 nm or less, and preferably 0.25 nm or less, from the standpoint of high-density recording using a low flying-height recording head.

It is preferable that, after texturing treatment, the average surface roughness Ra of the substrate be 0.1 nm or greater and 0.8 nm or less. If under 0.1 nm, the effect of texturing treatment is insufficient and the magnetic anisotropy of the soft magnetic underlayer 3 deviates. This situation is undesirable. A roughness exceeding 0.8 nm is undesirable since the low flying height of the magnetic head 13 cannot be achieved. In addition, a decline in the SNR is reduced by the degradation of the alignment of the perpendicular magnetic anisotropy.

The soft magnetic layers 4 and 6 consist of soft magnetic material; examples of such materials include Fe, Co, and Ni. As examples of such materials, FeCo alloys (FeCoB, FeCoSiB, FeCoZr, FeCoZrB, and similar), FeTa alloys (FeTaN, FeTaC, and similar), and Co alloys (CoTaZr, CoZrNb, CoB, and similar), can be given.

Also, a fine crystal structure of FeAlO, FeMgO, FeTaN, FeZrN, and similar, containing 60 at % or more Fe, as well as materials with a granular structure, in which fine crystal grains are dispersed in a matrix, may be used.

It is preferable in particular that the soft magnetic layers 4 and 6 have an amorphous structure or a fine crystalline structure. This is because, by means of an amorphous structure or a fine crystalline structure, the effect of texturing becomes more pronounced.

It is preferable that the coercive force Hc of the soft magnetic layers 4 and 6 be 30 (Oe) or less, and a value of 10 (Oe) or less is still more preferable. One Oersted is equal to approximately 79 A/m.

It is preferable that the saturation magnetic flux density Bs of the soft magnetic layers 4 and 6 be 0.6 T or higher, and a value of 1 T or higher is still more preferable.

It is preferable that the total layer thickness of the soft magnetic layers 4 and 6 in the soft magnetic underlayer 3 be 120 nm or less, and still more preferable that the total thickness be 30 nm or greater but 100 nm or less. If the total layer thickness of the soft magnetic layers 4 and 6 is less than 20 nm, the overwrite (OW) characteristics are degraded, which is undesirable.

As the method of formation of the soft magnetic layers 4 and 6, a sputtering method can be used.

In order to align the direction of the easy axis of magnetization of soft magnetic underlayer, heat treatment can be employed, in which a substrate is heated after the deposition of the soft magnetic underlayer 3 and then cooled under a uniform magnetic field.

It is desirable that the temperature to which the nonmagnetic substrate 2 is heated is in the range from 100° C. to 250° C. Further, it is preferable that the magnitude of the magnetic field be in the range from 20 Gauss to 500 Gauss, and still more preferable that the value be between 20 Gauss and 300 Gauss. One Gauss is equal to 100 μT.

It is preferable that the soft magnetic underlayer 3 have a configuration in which at least two soft magnetic layer layers 4 and 6, and Ru or Re between the soft magnetic layers 4 and 6, are provided. This is because, by providing Ru or Re with desired thickness, the soft magnetic layers 4 and 6 provided above and below is subjected to antiferromagnetic coupling. By means of such a configuration, the WATE phenomenon which is a problem for perpendicular media in particular can be alleviated.

The underlayer (alignment control layer) 7 is to control the crystal alignment and crystal size of the perpendicular magnetic recording layer 8 provided on top. It is preferable that the material used in the underlayer have an hcp structure or an fcc structure. In particular, Ru is preferable.

It is preferable that the thickness of the underlayer (alignment control layer) layer 7 be 30 nm or less. If the thickness of the underlayer (alignment control layer) 7 exceeds 30 nm, the distance between the magnetic head and the soft magnetic underlayer 3 during recording and reproduction is increased, so that the overwrite (OW) characteristic and reproduced signal resolution are degraded, which is undesirable.

The easy axis of magnetization of the perpendicular magnetic recording layer 8 is directed in the direction perpendicular to the plane of the nonmagnetic substrate 2. As the constituent elements, at least Co, Pt, and an oxide are included; and Cr, B, Cu, Ta, or Zr can be added in order to improve the SNR characteristic or for other reasons.

Examples of oxides for use in the perpendicular magnetic recording layer 8 include $SiO_2$, SiO, $Cr_2O_3$, CoO, $Ta_2O_3$, and TiO$_2$. It is preferable that the volume fraction of oxides be from 15 to 40 volume percent. If the volume fraction of oxides is less than 15 volume percent, the SNR characteristic is inadequate, which is undesirable. If the volume fraction exceeds 40 volume percent, the coercive force necessary for high-density recording cannot be obtained, which is undesirable.

It is preferable that the nucleation field (−Hn) of the perpendicular magnetic recording layer 8 be 1.5 (kOe) or greater. If the magnetic field (−Hn) is less than 1.5 (kOe), thermal fluctuations occur, which is undesirable.

It is preferable that the thickness of the perpendicular magnetic recording layer 8 be from 6 to 18 nm. If the thickness of the perpendicular magnetic recording layer 8 is in this range, sufficient output can be ensured, and there is no worsening of the overwrite (OW) characteristic, which is desirable.

The perpendicular magnetic recording layer 8 can have a single-layer structure, or can have a structure of two or more layers consisting of materials with different compositions.

The protective layer 9 is provided to prevent corrosion of the perpendicular magnetic recording layer 8 and to prevent damage to the media surface upon contact of the magnetic head 13 with the media; conventional materials, such as for example materials containing C, SiO$_2$ or ZrO$_2$, can be used. It is preferable that the thickness of the protective layer 9 be 1 nm or more and 5 nm or less, from the standpoint of reducing the distance between head and media to enable high-density recording.

As the lubrication layer 10, it is preferable that conventional materials, such as for example perfluoro-polyether, an alcohol fluoride, carboxylic acid fluoride, or similar, be used.

Figure 2:
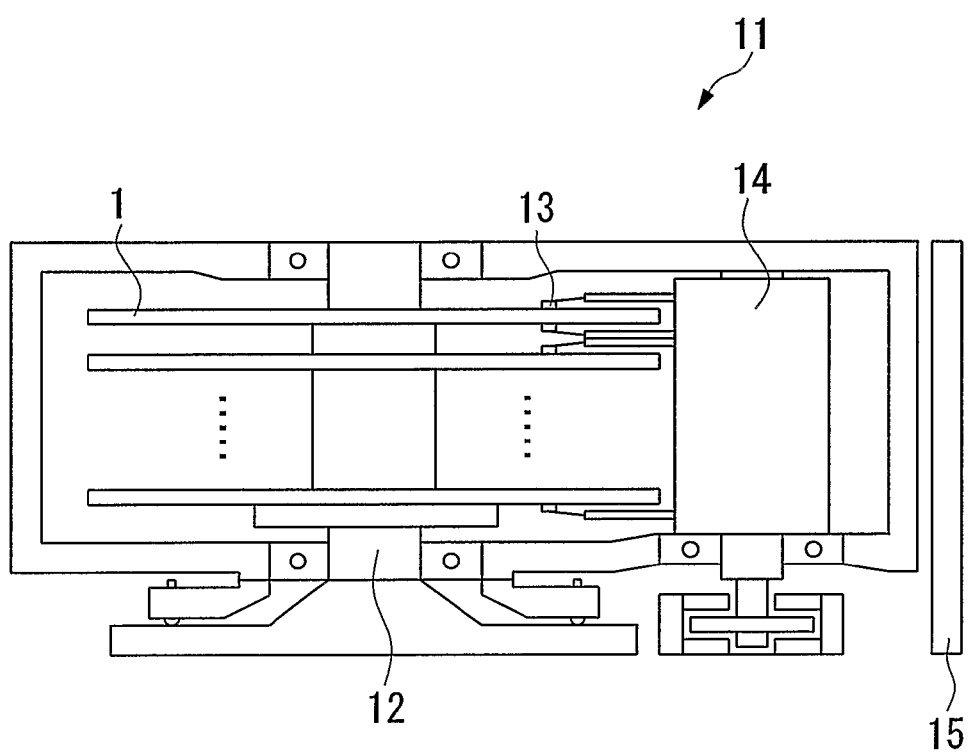
FIG. 2 shows an example of the configuration of a magnetic recording and reproducing apparatus of the invention.

FIG. 2 shows an example of a magnetic recording and reproducing apparatus 11 using the above perpendicular magnetic recording media 1. The magnetic recording and reproducing apparatus 11 shown here is provided with perpendicular magnetic recording media 1, a spindle motor 12 to drive in rotation the perpendicular magnetic recording media 1, magnetic heads 13 to record and reproduce information to and from the perpendicular magnetic recording media 1, a head actuator 14, and a recording and reproducing signal processing system 15. The recording and reproducing signal processing system 15 can process input data and send recording signals to the magnetic heads 13, and can process reproduced signals from the magnetic heads 13 and output data.

Below, the effect and advantageous results of this invention are clarified through embodiments. However, this invention is not limited to the following embodiments. For example, directions except the radial direction of the nonmagnetic substrate in this invention includes, at least, a spiral shape as shown FIG. 18 and alignment in one direction within the plane of the substrate as shown in FIG. 9.

EMBODIMENTS AND COMPARISON EXAMPLES

After washing the glass substrate (crystallized substrate TS10-SX, diameter 2.5 inches, manufactured by Ohara Inc.), the glass substrate was placed in the film deposition chamber of a DC magnetron sputtering system (Anelva Corp. model C-3010), and the film deposition chamber was evacuated to a background pressure of $1\times10^{-5}$ Pa. On this glass substrate were deposited a 91Co-5Zr-4Nb (Co content 91 at %, Zr content 5 at %, Nb content 4 at %) layer to 60 nm as the first soft magnetic layer, Ru to 0.8 nm, and a 91Co-5Zr-4Nb layer to 60 nm as the second soft magnetic layer, to form the soft magnetic underlayer. Then, this soft magnetic underlayer was subjected to heat treatment and cooling in a magnetic field. When using this system, the easy axis of magnetization of the soft magnetic underlayer was fixed at a direction 45° from the radial direction of the substrate under the influence of the magnetic field of the sputtering cathode. Thereafter, by adjusting the conditions of the heating and the following cooling treatment, the direction of the easy axis of magnetization can be changed. A samples with different easy magnetization axis directions were fabricated by different conditions of heating and cooling process, and after retrieving the samples from the vacuum chamber, the easy magnetization axis direction and the bias field Hbias in this direction were measured. The heating and cooling times of these samples, the angle θ made by the easy axis of magnetization with the substrate radial direction, and the bias field Hbias in the easy axis direction, are summarized as Embodiments 1 through 5 in Table 1.

Also, after forming a soft magnetic underlayer prepared by the same fabrication method as in Embodiments 1 through 5, a sputtering method was used to deposit 6 nm of a Pd seed layer (first underlayer), 20 nm of an Ru underlayer (second underlayer), 10 nm of a CoCrPt—SiO$_2$ magnetic recording layer, and 5 nm of a C protective layer. Then, a lubrication layer of perfluoro-polyether was dip-coated, and then the perpendicular magnetic recording media was obtained. These samples were prepared as Embodiments 6 through 10.

On the other hand, samples prepared by the same method as Embodiment 6, except for the fact that the soft magnetic material composition was 85 Co-4Zr-11Nb, are described in Table 1 as Comparison Examples 1 through 4.

WATE measurements were performed for Embodiments 6 through 10 and Comparison Examples 1 through 4. The method of evaluation was as follows.

1) A basic pattern was recorded at 156 kfci throughout the area of, ±6 μm.

2) The average output for each track was measured over all tracks, and was taken to be the track profile in the initial state.

3) A 937 kfci signal was recorded repeatedly for 10,000 times on one track in the center of the area.

4) The track profile was once again measured, the result was compared with the initial state.

The track profiles obtained in this way are shown in FIG. 3 through FIG. 8 for all the samples except Embodiment 8. For all the track profiles, the maximum attenuation in the profile after recording of 10,000 times, relative to the initial profile, was calculated.

TABLE 1

|  | Material | Film thickness (nm) | Heating time (sec) | Cooling time (sec) | Bias field (Oe) | Easy magnetization axis direction (deg) | WATE maximum reduction (%) | Track profile |
|---|---|---|---|---|---|---|---|---|
| Embodiment 1 Embodiment 6 | 91Co—5Zr—4Nb | 60 | 0 | 0 | 22 | 45 | 0 | FIG. 3 |

TABLE 1-continued

Figure 8A:
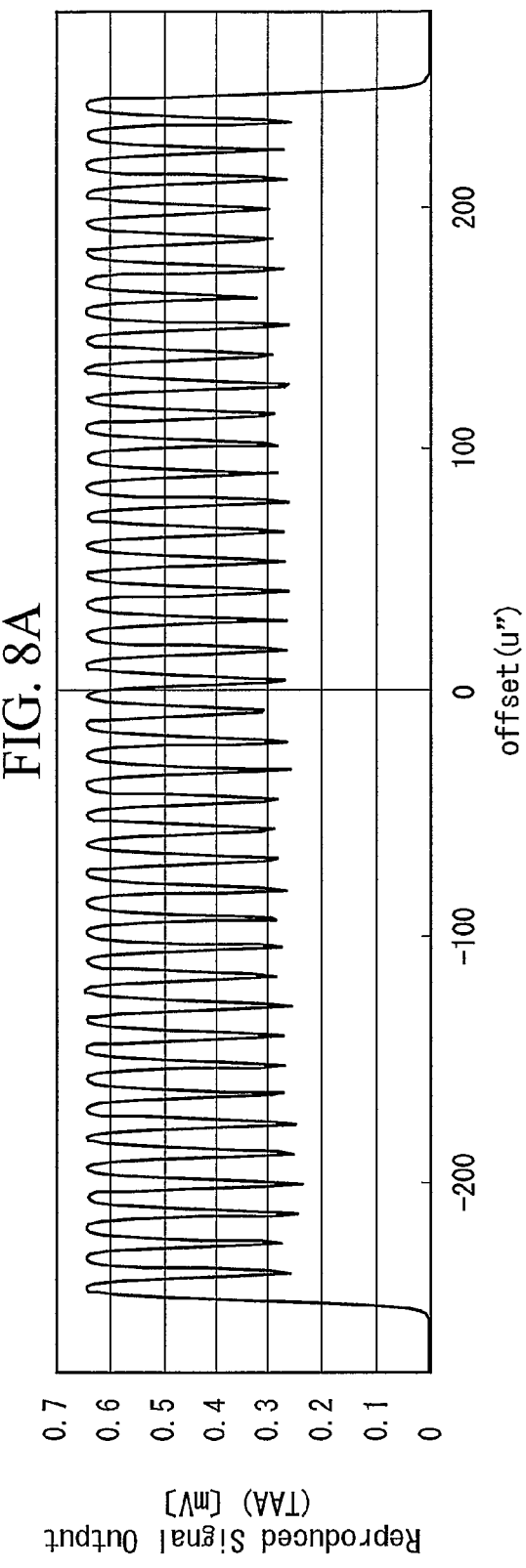
FIG. 8 shows profiles of tracks in Comparison Example 2 and Comparison Example 4, wherein (A) shows the initial state, and (B) shows a state after recording.
Figure 8B:
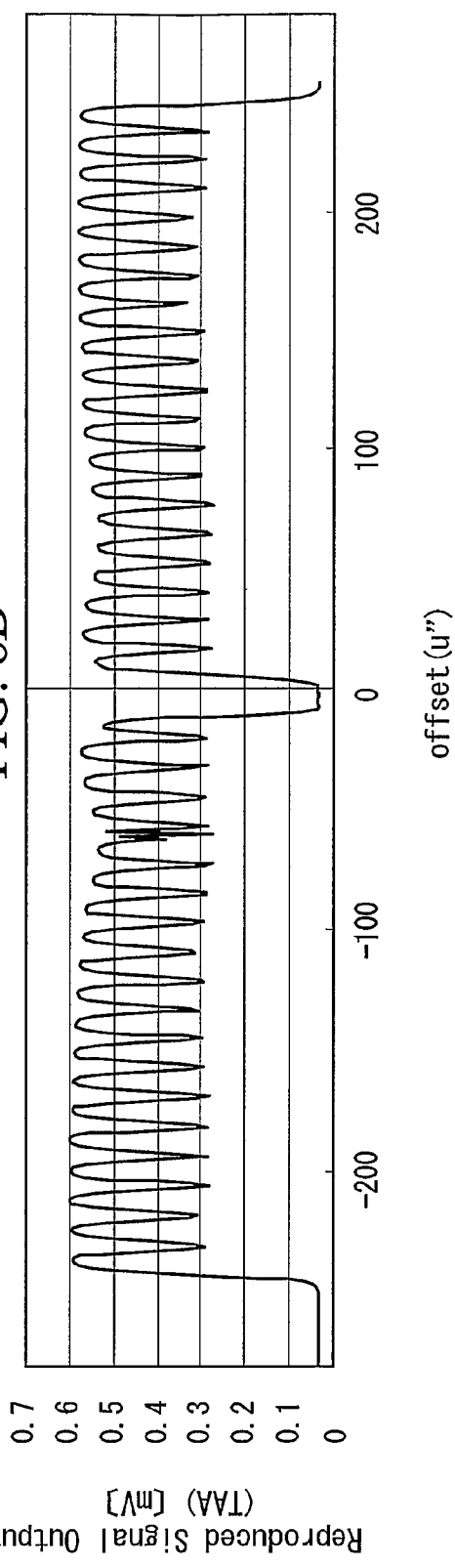

| | Material | Film thickness (nm) | Heating time (sec) | Cooling time (sec) | Bias field (Oe) | Easy magnetization axis direction (deg) | WATE maximum reduction (%) | Track profile |
|---|---|---|---|---|---|---|---|---|
| Embodiment 2 Embodiment 7 | 91Co—5Zr—4Nb | 60 | 5 | 200 | 16 | 45 | 0 | FIG. 4 |
| Embodiment 3 Embodiment 8 | 91Co—5Zr—4Nb | 60 | 10 | 400 | 17 | 15 | — | — |
| Embodiment 4 Embodiment 9 | 91Co—5Zr—4Nb | 60 | 15 | 400 | 24 | 5 | 0 | FIG. 5 |
| Embodiment 5 Embodiment 10 | 91Co—5Zr—4Nb | 60 | 20 | 600 | 27 | 5 | 0 | FIG. 6 |
| Comparison Example 1 Comparison Example 3 | 85Co—4Zr—11Nb | 60 | 0 | 0 | 9 | 45 | 15 | FIG. 7 |
| Comparison Example 2 Comparison Example 4 | 85Co—4Zr—11Nb | 60 | 20 | 600 | 6 | 5 | 18 | FIG. 8 |

From the above, it is clear that if the easy axis of magnetization of the soft magnetic underlayer is oriented to a desired direction, and still more preferably the bias field Hbias is 10 Oersteds or higher, the tolerance against the WATE (Wide Area Track Erasure, or Wide Adjacent Track Erasure) can be improved.

Next, as Embodiments 11 through 13, soft magnetic underlayer was fabricated by a method similar to that of Embodiment 6, except for applying a magnetic field in the cooling process in a single direction within the substrate plane. It was found that the direction of the magnetization of soft magnetic underlayer was aligned in a single direction 16 within the substrate plane, as shown in FIG. 9. The hysteresis in the easy magnetization axis direction was measured to determine the bias field Hbias; the results are summarized in Table 2. As Embodiments 14 through 16, track profiles and attenuation were measured for perpendicular magnetic recording media deposited on soft magnetic underlayers fabricated under the same conditions. The results appear in FIG. 10 through FIG. 12.

As is seen from these results, by aligning the easy axis of magnetization of the soft magnetic underlayer in the same in-plane direction, rather than in the radial direction of the substrate, it is possible to provide perpendicular magnetic recording media with an excellent WATE (Wide Area Track Erasure, or Wide Adjacent Track Erasure) tolerance.

TABLE 2

Figure 11A:
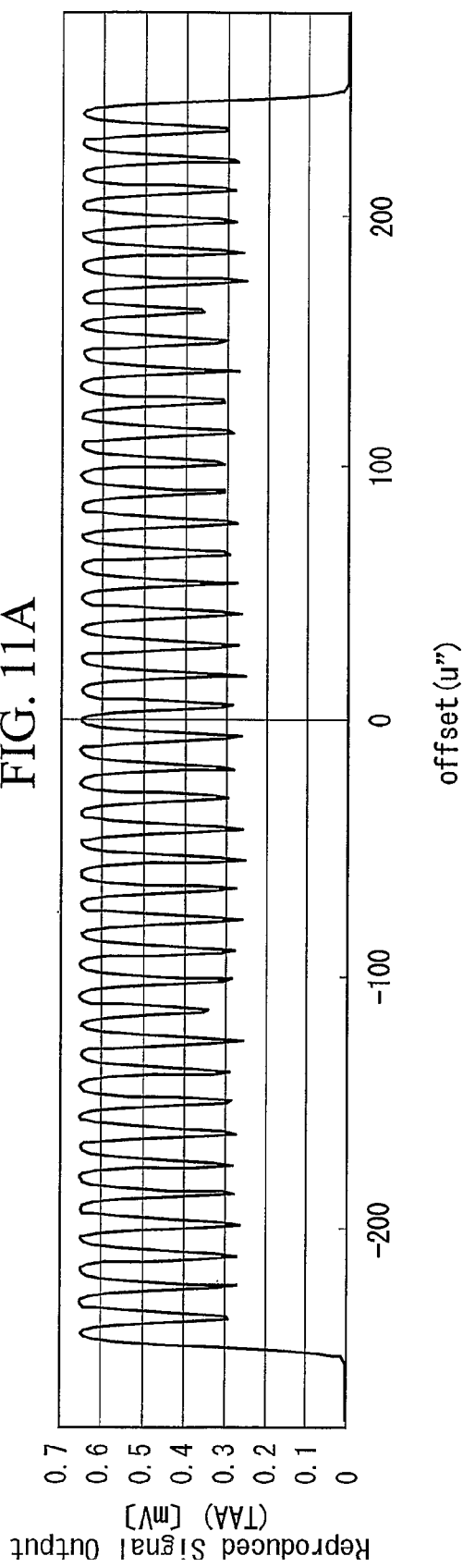
FIG. 11 shows profiles of tracks in Embodiment 12 and Embodiment 15, wherein (A) shows the initial state, and (B) shows a state after recording.
Figure 11B:
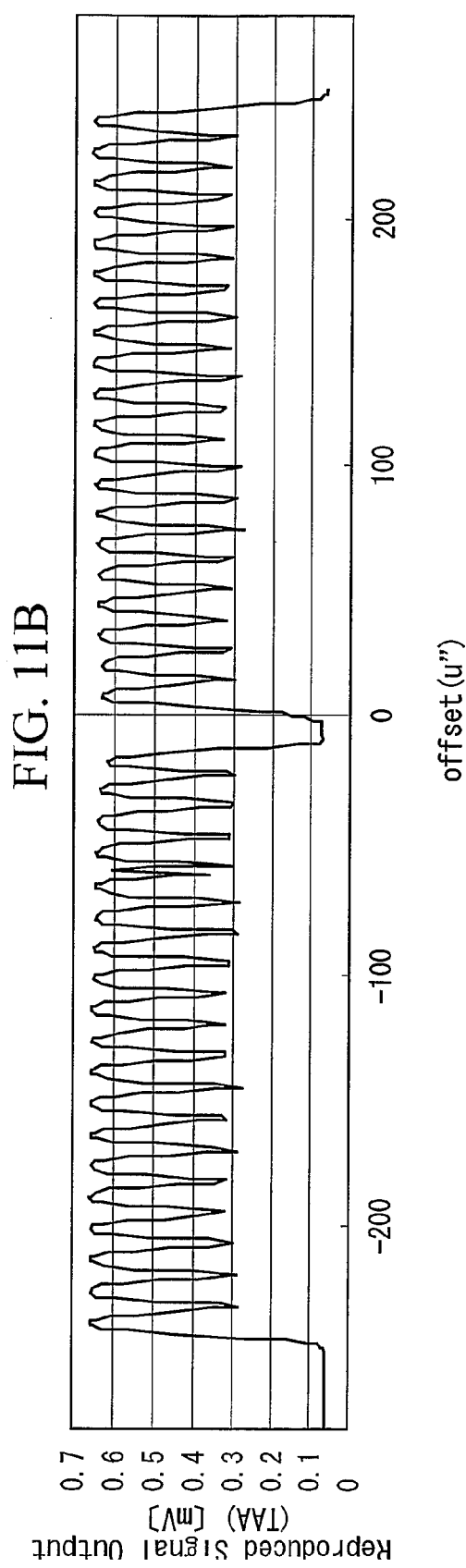

| | Material | Film thickness (nm) | Heating time (sec) | Cooling time (sec) | Bias field (Oe) | WATE maximum reduction (%) | Track profile |
|---|---|---|---|---|---|---|---|
| Embodiment 11 Embodiment 14 | 91Co—5Zr—4Nb | 60 | 5 | 200 | 22 | 0 | FIG. 10 |
| Embodiment 12 Embodiment 15 | 91Co—5Zr—4Nb | 60 | 10 | 400 | 16 | 4 | FIG. 11 |
| Embodiment 13 Embodiment 16 | 91Co—5Zr—4Nb | 60 | 5 | 400 | 17 | 1 | FIG. 12 |

Also, a sample was prepared by the same method as Embodiment 6, other than the fact that heating and magnetic field cooling were not performed, and this was taken to be Comparison Example 5. The easy axis of magnetization of the soft magnetic underlayer of this sample did not have a specific direction, but was substantially isotropic (random) within the plane. WATE characteristics were evaluated for this sample, similar to Embodiment 6.

Figure 13A:
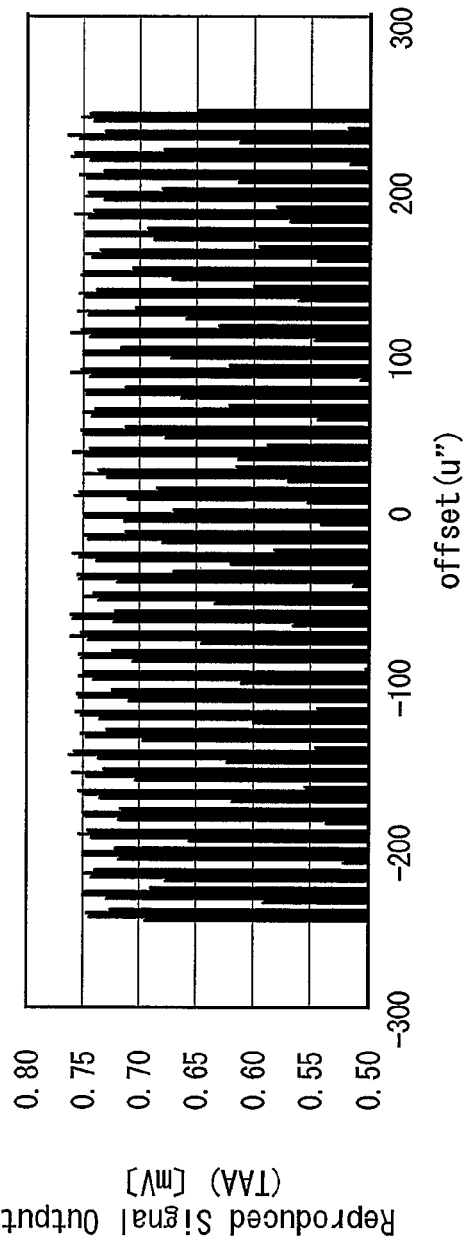
FIG. 13 shows profiles of tracks in Comparison Example 5, wherein (A) shows the initial state, and (B) shows a state after recording.
Figure 13B:
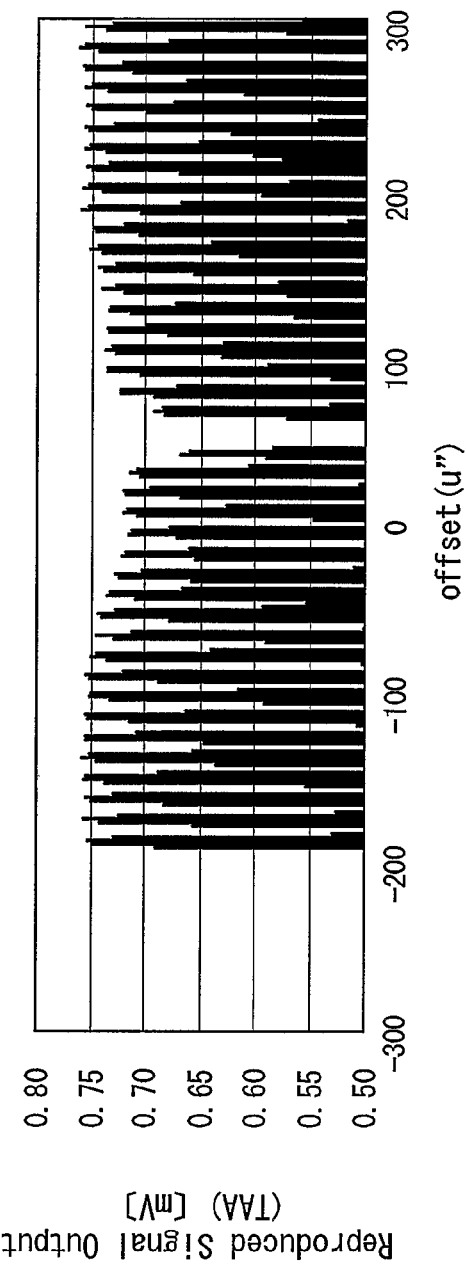

The results of evaluations appear in FIG. 13. When the soft magnetic underlayer does not have a magnetic anisotropy, an extremely prominent WATE phenomenon is observed.

TABLE 3

| | Material | Film thickness (nm) | Heating time (sec) | Cooling time (sec) | Bias field (Oe) | Easy magnetization axis direction | WATE maximum reduction (%) | Track profile |
|---|---|---|---|---|---|---|---|---|
| Comparison Example 5 | 91Co—5Zr—4Nb | 60 | 0 | 0 | 4 | random | 12 | FIG. 13 |

Perpendicular magnetic recording media was fabricated using the same procedure as in Embodiment 6 to direct the easy axis of magnetization of the soft magnetic underlayer in the 0° direction (θ=0), that is, in the substrate radial direction. This was taken to be Comparison Example 6, and the read and write characteristics were compared with those of the magnetic recording media fabricated in Embodiments 6, 8 and 9. The measurements were performed under the conditions of Table 4. Measurement results for the main read and write parameters are summarized in Table 5. As is clear from the measurement results of Table 5, among the read and write characteristic parameters, the SNR characteristic was degraded in Comparison Example 6. As is seen from this result, if the easy axis of magnetization of the soft magnetic underlayer is directed in the substrate radial direction, the WATE characteristic is good but the read and write characteristics, in particular the SNR, is bad.

TABLE 4

| Tester | Guzik RWA2550++A |
|---|---|
| Spin stand | S-1701B |
| Substrate rotation rate | 4200 |
| Test radius | 22.21 mm |
| Frequency during high-frequency recording (HF) | 166.24 NHz |
| Frequency during medium-frequency recording (MF) | 83.12 MHz |
| Frequency during low-frequency recording (LF) | 13.85 MHz |

TABLE 5

| | Embodiment 6 | Embodiment 8 | Embodiment 9 | Comparison Example 6 |
|---|---|---|---|---|
| Direction of easy axis of magnetization (deg) | 45 | 15 | 5 | 0 |
| Bias field (Oe) | 22 | 17 | 24 | 23 |
| Reproduced signal output for high-frequency recording (HF) (mV) | 1.016 | 1.020 | 1.3020 | 1.117 |
| Reproduced signal output for medium-frequency recording (MF) (mV) | 2.978 | 2.767 | 2.878 | 2.945 |
| Reproduced signal output for low-frequency recording (LF) (mV) | 4.245 | 4.265 | 4.124 | 4.285 |
| Isolated-wave half-maximum width (PW50) (nsec) | 6.4 | 6.5 | 6.6 | 6.6 |
| Overwrite (OW) (dB) | 45.45 | 43.29 | 44.05 | 44.89 |
| Ratio of reproduced signal to output noise (SNR) (MF output/MF noise) (dB) | 27.27 | 27.6 | 27.8 | 25.5 |

After washing the glass substrate (crystallized substrate TS10-SX, diameter 2.5 inches, manufactured by Ohara Inc.), the substrate was subjected to mechanical texturing in the circumferential direction using a diamond abrasive. The average surface roughness Ra of the substrate after this texturing treatment was 0.30 μm.

The substrate was placed in the film deposition chamber of a DC magnetron sputtering system (Anelva Corp. model C-3010), and the film deposition chamber was evacuated to a background pressure of $1 \times 10^{-5}$ Pa. On this glass substrate were deposited a 91Co-5Zr-4Nb (Co content 91 at %, Zr content 5 at %, Nb content 4 at %) layer to 60 nm as the soft magnetic layer 1, Ru to 0.8 nm, and a 91Co-5Zr-4Nb layer to 60 nm as the soft magnetic layer 2, to form the soft magnetic underlayer. Then, this sample was removed from the film deposition chamber, and the soft magnetic characteristics were measured. The results are summarized in Table 6.

TABLE 6

Figure 14A:
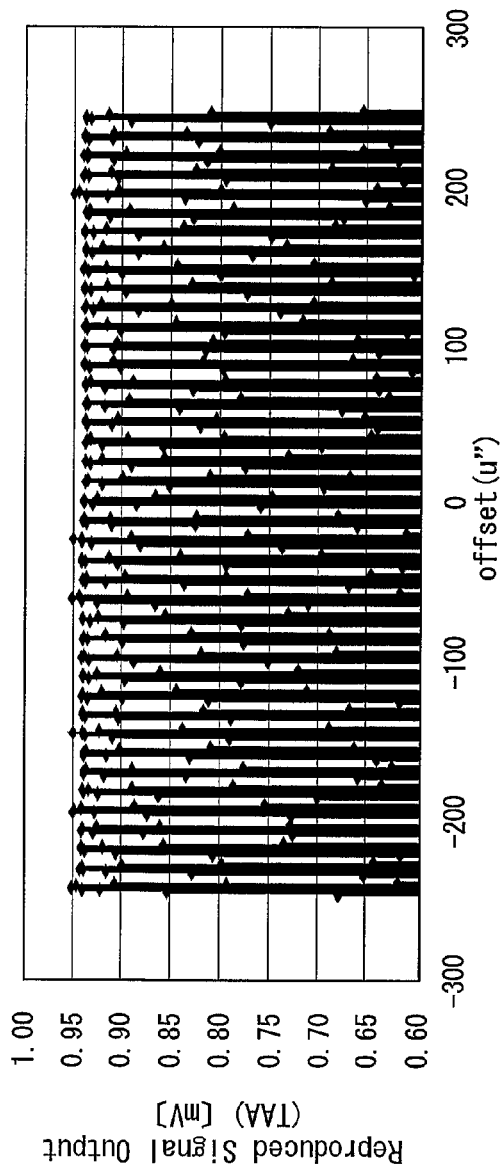
FIG. 14 shows profiles of tracks in Embodiment 18, wherein (A) shows the initial state, and (13) shows a state after recording.
Figure 14B:
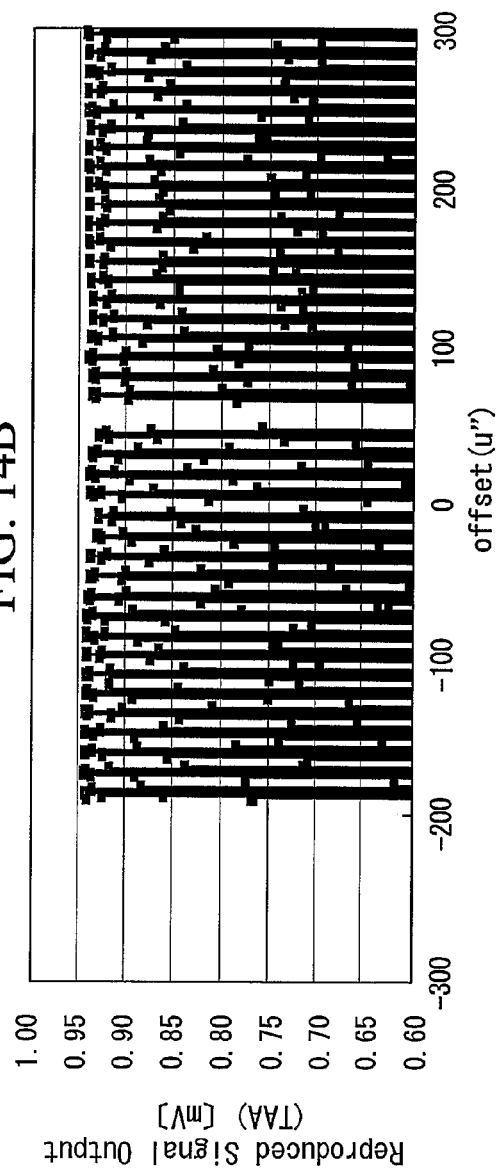

| | Material | Film thickness (nm) | Bias field (Oe) | Easy magnetization axis direction (deg) | WATE maximum reduction (%) | Track profile |
|---|---|---|---|---|---|---|
| Embodiment 17 | 91Co—5Zr—4Nb | 60 | 25 | 90 | 5 | FIG. 14 |
| Embodiment 18 | | | | | | |

In succession to a soft magnetic underlayer deposited similarly to Embodiment 17, a sputtering method was used to deposit 6 nm of a Pd seed layer (first underlayer), 20 nm of a Ru base layer (second underlayer), 10 nm of a CoCrPt—SiO₂ magnetic recording layer, and 5 nm of a C protective layer. Then, a dipping method was used to form a lubrication layer of perfluoro-polyether, to obtain the perpendicular magnetic recording media.

WATE characteristics were evaluated, similarly to Embodiment 6, for the perpendicular magnetic recording media obtained in this way. The results appear in FIG. 14. As is seen from the figure, even when the easy axis of magnetization of the soft magnetic underlayer is directed in the circumferential direction, when the soft magnetic underlayer has a two-layer structure with Ru enclosed there between and if the bias field Hbias arising from antiferromagnetic coupling is sufficiently high, excellent WATE characteristics are obtained.

Figure 15A:
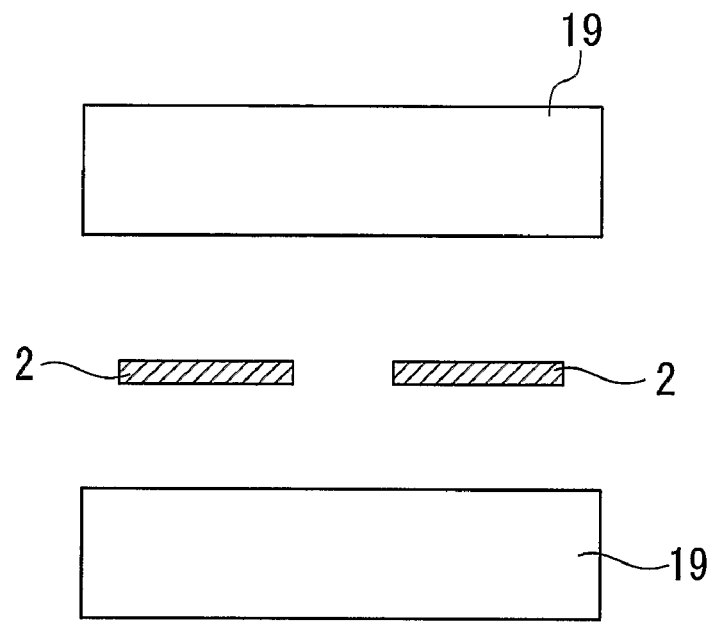
FIG. 15 shows the state of placement of target and substrate in Embodiment 19 and Embodiment 20, wherein (A) is a side view and (B) is a top view.
Figure 15B:
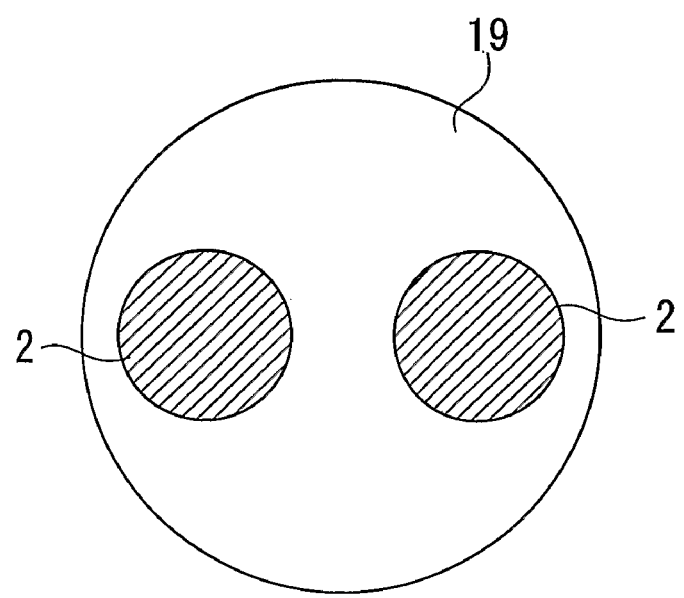

Further, perpendicular magnetic recording media was fabricated using silicon substrates of diameter 22 mm (0.85 inches). Two substrates were placed in a sputtering chamber and films were deposited simultaneously onto the two substrates from a single target. At this time, the arrangement of target and substrates was as shown in FIG. 15. Other than the substrate size and substrate-target positional, the film deposition conditions and evaluation conditions were the same as in Embodiment 6. At this time, it was confirmed that the easy axis 16 of magnetization of the soft magnetic underlayer, under the influence of the magnetic flux from the target, was distributed in a circle sector shape, wherein the center of the sector locates outside of the substrate 2, as shown in FIG. 16. The results of investigations of the WATE characteristics for the two media samples appear in Table 7. When using substrates of smaller diameter, often film deposition is performed simultaneously onto a plurality of substrates for the cost reduction in industrial production. In this case, the position of the substrates relative to the sputtering cathode, and the magnetic field distribution from the cathode, are of course different for each of the substrates onto which simultaneous film deposition is performed. Hence it is easily anticipated that the distribution of the easy axis of magnetization of the soft magnetic underlayer in these small-diameter perpendicular magnetic recording media samples, onto which films were deposited simultaneously, was random even within the plane of the substrate, and that the easy axis distribution would also be different for each substrate. However, it is clear that when the soft magnetic underlayer satisfies the conditions stipulated in the claims of the invention, sufficient WATE tolerance is obtained.

TABLE 7

| | Substrate diameter (mm) | Material | Film thickness (nm) | Bias field. (Oe) | Easy magnetization axis direction (deg) | WATE maximum reduction (%) |
|---|---|---|---|---|---|---|
| Embodiment 19 | 22 | 91Co—5Zr—4Nb | 60 | 25 | sector shape | 0 |
| Embodiment 20 | 22 | 91Co—5Zr—4Nb | 60 | 25 | sector shape | 0 |

INDUSTRIAL APPLICABILITY

According to this invention, in magnetic recording media adopting the perpendicular magnetic recording method, the soft magnetic underlayer (soft magnetic underlayer) has a structure in which at least two soft magnetic layers, and Ru or Re between the two soft magnetic layers, are provided; the easy axis of magnetization of the soft magnetic underlayer has a desired direction; the easy axis of magnetization of the soft magnetic underlayer is substantially distributed in a direction except radial direction of the nonmagnetic substrate, and, the bias magnetic field Hbias of antiferromatic coupling in the direction of the easy axis of magnetization of the soft magnetic underlayer is made equal to or greater than 10 Oersteds (790 A/m), so that the WATE phenomenon which is a problem particular to perpendicular magnetic recording media can be effectively suppressed. In particular, upon use with small-diameter substrates of diameter 26 mm or less, difficulty in controlling the magnetic field distribution near the substrate is suppressed.

The invention claimed is:

1. A perpendicular magnetic recording media, comprising
a disc-shaped nonmagnetic substrate,
a soft magnetic underlayer on the disc-shaped nonmagnetic substrate, comprised of
at least two soft magnetic layers and
a layer of Ru or Re between said two soft magnetic layers, and
a perpendicular magnetic recording layer;
wherein,
easy axes of magnetization of said soft magnetic underlayer are distributed in parallel in the same direction with each other, and
a bias magnetic field of the antiferromagnetic coupling in the direction of the easy axis of magnetization of said soft magnetic underlayer is 10 Oersteds (790 A/m) or greater.

2. A perpendicular magnetic recording media according to claim 1, wherein said nonmagnetic substrate is of glass or of silicon.

3. A perpendicular magnetic recording media according to claim 1, wherein the total film thickness of said soft magnetic layers constituting said soft magnetic underlayer is 20 nm or greater and 120 nm or less.

4. A perpendicular magnetic recording media according to claim 1, wherein the diameter of said nonmagnetic substrate is 26 mm or less.

5. A magnetic recording and reproducing apparatus, comprising
the perpendicular magnetic recording media according to claim 1, and
a magnetic head to record information onto and reproduce information from said perpendicular magnetic recording media.

6. A perpendicular magnetic recording media comprising
a disc-shaped nonmagnetic substrate,
a soft magnetic underlayer on the disc-shaped nonmagnetic substrate, comprised of
at least two soft magnetic layers and
a layer of Ru or Re between said two soft magnetic layers, and
a perpendicular magnetic recording laver;
wherein easy axes of magnetization of said soft magnetic underlayer are distributed in a spiral shape, and in a direction from a center portion to a circumferential portion of the nonmagnetic substrate, and
a bias magnetic field of the antiferromagnetic coupling in the direction of the easy axis of magnetization of said soft magnetic underlayer is 10 Oersteds (790 A/m) greater.

7. A magnetic recording and reproducing apparatus, comprising
the perpendicular magnetic recording media according to claim 6, and
a magnetic head to record information onto and reproduce information from said perpendicular magnetic recording media.

8. A perpendicular magnetic recording media according to claim 6, wherein said nonmagnetic substrate is of glass or of silicon.

9. A perpendicular magnetic recording media according to claim 6, wherein the total film thickness of said soft magnetic layers constituting said soft magnetic underlayer is 20 nm or greater and 120 nm or less.

10. A perpendicular magnetic recording media according to claim 6, wherein the diameter of said nonmagnetic substrate is 26 mm or less.

11. A perpendicular magnetic recording media comprising
a disc-shaped nonmagnetic substrate,
a soft magnetic underlayer on the disc-shaped nonmagnetic substrate, comprised of
   at least two soft magnetic layers and
   a layer of Ru or Re between said two soft magnetic layers, and
a perpendicular magnetic recording layer;
wherein easy axes of magnetization of said soft magnetic underlayer are distributed in a radial direction of a circle sector from a center to an arc of the circle sector, wherein the center of the circle sector locates near the circumferential portion of the substrate or outside of the substrate other than at the center portion of the substrate, and
   a bias magnetic field of the antiferromagnetic coupling in the direction of the easy axis of magnetization of said soft magnetic underlayer is 10 Oersteds (790 A/m) or greater.

12. A magnetic recording and reproducing apparatus, comprising
   the perpendicular magnetic recording media according to claim 11, and
   a magnetic head to record information onto and reproduce information from said perpendicular magnetic recording media.

13. A perpendicular magnetic recording media according to claim 11, wherein said nonmagnetic substrate is of glass or of silicon.

14. A perpendicular magnetic recording media according to claim 11, wherein the total film thickness of said soft magnetic layers constituting said soft magnetic underlayer is 20 nm or greater and 120 nm or less.

15. A perpendicular magnetic recording media according to claim 11, wherein the diameter of said nonmagnetic substrate is 26 mm or less.

* * * * *